United States Patent
Shimizu

(10) Patent No.: US 8,520,310 B2
(45) Date of Patent: Aug. 27, 2013

(54) IMAGE DISPLAY DEVICE, HEAD-MOUNTED DISPLAY AND HEAD-UP DISPLAY

(75) Inventor: Yoshie Shimizu, Ibaraki (JP)

(73) Assignee: Konica Minolta Opto, Inc., Tokyo (JP)

( * ) Notice: Subject to any disclaimer, the term of this patent is extended or adjusted under 35 U.S.C. 154(b) by 314 days.

(21) Appl. No.: 13/061,877

(22) PCT Filed: Aug. 27, 2009

(86) PCT No.: PCT/JP2009/064995
§ 371 (c)(1),
(2), (4) Date: Mar. 2, 2011

(87) PCT Pub. No.: WO2010/035607
PCT Pub. Date: Apr. 1, 2010

(65) Prior Publication Data
US 2011/0164294 A1 Jul. 7, 2011

(30) Foreign Application Priority Data

Sep. 26, 2008 (JP) ................................. 2008-247556
Sep. 26, 2008 (JP) ................................. 2008-247557

(51) Int. Cl.
*G02B 27/14* (2006.01)
*G09G 5/00* (2006.01)

(52) U.S. Cl.
USPC .............................................. 359/630; 345/7

(58) Field of Classification Search
USPC ............. 359/13–14, 404, 409–410, 462, 466, 359/603–639, 407; 345/7, 9; 348/115; 353/11–12, 28, 119; 340/438, 980, 995.1, 340/815.47, 815.74
See application file for complete search history.

(56) References Cited

U.S. PATENT DOCUMENTS

| 7,245,273 B2 * | 7/2007 | Eberl et al. ......................... 345/7 |
| 2004/0075914 A1 | 4/2004 | Yamamoto ..................... 359/726 |
| 2004/0218243 A1 | 11/2004 | Yamazaki et al. ............. 359/212 |

(Continued)

FOREIGN PATENT DOCUMENTS

| EP | 1 471 374 A1 | 10/2004 |
| JP | 2000-132073 A | 5/2000 |

(Continued)

OTHER PUBLICATIONS

Office Action dated Dec. 25, 2012 in a corresponding Japanese Patent Application No. 2012-530799.

*Primary Examiner* — Dawayne A Pinkney
(74) *Attorney, Agent, or Firm* — Cozen O'Connor

(57) ABSTRACT

Light outputted from a laser light source (12) of an image generating section (11) is two-dimensionally deflected and permitted to perform scanning by means of a reflecting surface (13a) of a deflecting device (13), diffused by means of a diffusion unit (14), and then diffracted and reflected by an HOE (23) of an eyepiece optical system (4), and guided to an optical pupil (E). Deterioration of qualities of an observing image can be eliminated by setting the optical pupil (E) and the reflecting surface (13a) of the deflecting device (13) to have an optically conjugated positional relationship. Furthermore, since a prescribed conditional equation is satisfied and the diffusion unit (14) has positive power, even when the optical pupil (E) and reflecting surface (13a) of the deflecting device (13) are set to have the conjugated positional relationship, the distance between the reflecting surface (13a) and the diffusion unit (14) can be short, and the image generation section (11) can be prevented from being large in size.

15 Claims, 24 Drawing Sheets

(56) References Cited

U.S. PATENT DOCUMENTS

| | | | |
|---|---|---|---|
| 2005/0068255 A1 | 3/2005 | Urakawa | 345/7 |
| 2006/0139760 A1 | 6/2006 | Yamamoto et al. | 359/630 |
| 2007/0291355 A1 | 12/2007 | Tanijiri | 359/467 |
| 2010/0103077 A1* | 4/2010 | Sugiyama et al. | 345/8 |

FOREIGN PATENT DOCUMENTS

| | | |
|---|---|---|
| JP | 2004-138822 A | 5/2004 |
| JP | 2004-325672 A | 11/2004 |
| JP | 2005-107179 A | 4/2005 |
| JP | 2006-184726 A | 7/2006 |
| JP | 2007-079298 A | 3/2007 |
| JP | 2007-333952 A | 12/2007 |
| JP | 2008-216599 A | 9/2008 |
| WO | WO 2008/108304 A1 | 9/2008 |
| WO | WO 2010/035607 A1 | 4/2010 |

* cited by examiner

IMAGE DISPLAY DEVICE, HEAD-MOUNTED DISPLAY AND HEAD-UP DISPLAY

RELATED APPLICATIONS

This is a U.S. National Stage under 35 U.S.C. §371 of International Application No. PCT/JP2009/064995, filed in the Japanese Patent Office on Aug. 27, 2009, and claims priority on Japanese Patent Application Nos. 2008-247556, filed on Sep. 26, 2008, and 2008-247557, filed on Sep. 26, 2008.

TECHNICAL FIELD

The present invention relates to an image display device that guides image light from an image generation portion to an optical pupil of an eyepiece optical system, thereby allowing an observer to observe a virtual image of the image at a position of the optical pupil; to a head-mounted display (hereinafter, also called an HMD) that includes the image display device; and a head-up display (hereinafter, also called an HUD) that includes the image display device.

BACKGROUND ART

In an image display device that reflects laser light by means of a reflection surface of a deflection means to perform two-dimensional deflection and scanning; and allows an observer to observe an image (virtual image) via an eyepiece optical system, each scanned ray enters the retina, so that observer recognizes the image (so-called Maxwellian view). Accordingly, if the position of the observer's pupil moves around up, down, left and right from the position of an optical pupil formed by the eyepiece optical system, the image ray does not enter the retina, so that it becomes impossible for the observer to observe the image.

Regarding this point, in a patent document 1, for example, in a structure that uses a laser scan optical system, a diffusion plate is disposed in a light path to spread an optical pupil. In this case, even if the position of an observer's pupil moves around up, down, left and right in a plane of the optical pupil, it is possible to guide image rays to the retina, so that the observer is able to observe the image.

PRIOR-ART DOCUMENT

Patent Document

Patent document 1: JP-A-2000-132073

SUMMARY OF THE INVENTION

Problems to be Solved by the Invention

However, the patent document 1 does not refer to an optical positional relationship between the optical pupil and the scan system surface (reflection surface of a deflection means) at all; and the quality of the observed image is likely to deteriorate. For example, if the optical pupil is situated at a point dislocated from a position that is conjugate with the reflection surface of the deflection means, the light use efficiency deteriorates, so that the observed image is likely to become dark; or part of the image light does not enter the observer's pupil, so that the part of the image is likely to be missed. Besides, in the structure in which a general diffusion plate is disposed in the light path, if a long distance between the reflection surface of the deflection means and the diffusion plate is not secured, it is impossible to obtain an optically conjugate positional relationship between the optical pupil and the reflection surface of the deflection means; as a result of this, the image generation portion having the laser light source, the deflection means and the diffusion plate becomes large.

Besides, in the image display device, by moving the image generation portion that has a laser scan optical system and a diffusion plate in a direction that comes close to an eyepiece optical system or in a direction that goes away from the eyepiece optical system, it is possible to adjust the diopter of a virtual image, that is, the display distance of the virtual image from the optical pupil. As described above, by adjusting the diopter of the virtual image, it is possible to give various advantages to the observer. For example, as for a head-up display, in a case where a word "caution" is displayed as a virtual image to allow the observer to observe the word, by moving the word "caution" closer to the observer by means of the diopter adjustment, it is possible to increase the visibility of the virtual image; and in this example, it is possible to prompt the observer to take caution.

However, the patent document 1 does not refer to the optical positional relationship between the optical pupil and the scan system surface (reflection surface of the deflection means) at all, so that when the image generation portion is moved to adjust the diopter of a virtual image, the quality of the observed image is likely to deteriorate. In other words, for example, because of the adjustment of the diopter of the virtual image, if the optical pupil is situated at a point dislocated from the position where the optical pupil is conjugate with the reflection surface of the deflection means, the light use efficiency deteriorates, so that the observed image is likely to become dark; or at a moving time of the image generation portion, the state of light flux traveling from the diffusion plate to a hologram combiner of the eyepiece optical system changes; and rays (especially, the principal ray that has the highest energy intensity) that are diffracted by the hologram combiner and output from the respective image heights do not pass through the same point in the optical-pupil plane; as a result of this, even if the position of the observer's pupil moves around only slightly, part of the image is missed and brightness unevenness occurs in the screen.

The present invention has been made to solve the above problems, and it is an object of the present invention to provide an image display device that is able to avoid deterioration of image quality by suitably setting a positional relationship between an optical pupil and a reflection surface of a deflection means, and able to obtain the advantage without enlarging an image generation portion; an HMD and an HUD that include the image display device.

Besides, it is another object of the present invention to provide an image display device that is able to avoid quality deterioration of an observed image irrespective of a diopter of the image by suitably keeping an optical positional relationship between an optical pupil and a reflection surface of a deflection means; an HMD and an HUD that include the image display device.

Means for Solving the Problem

An image display device according to the present invention is an image display device that guides image light from an image generation portion to an optical pupil of an eyepiece optical system, thereby allowing an observer to observe a virtual image of an image at a position of the optical pupil, the image generation portion includes:

a laser light source;

a deflection means that deflects and scans laser light emitted from the laser light source by a reflection surface in two scan directions which are perpendicular to each other; and a diffusion means that is disposed on an image surface of the eyepiece optical system and diffuses the laser light deflected by the deflection means;

wherein the eyepiece optical system includes a holographic optical element of a volume-phase type and of a reflective type as a combiner which diffracts and reflects the image light from the image generation portion to guide the image light to the optical pupil; and in parallel with which, transmits and guides external light to the optical pupil; and the image display device meets the following condition formulas (1) and (2) at all scan positions except a scan center in an area scanned by the deflection means:

$$\theta sx > \theta dx \tag{1}$$

$$\theta sy > \theta dy \tag{2}$$

wherein when of the two scan directions, a scan direction corresponding to a horizontal direction of an image that is observed at the position of the optical pupil is a first scan direction; a scan direction corresponding to a vertical direction of the image is a second scan direction; and an axis that optically connects a scan center of the reflection surface of the deflection means and a center of the optical pupil to each other is an optical axis, $\theta sx$: a scan angle in the first scan direction of the laser light entering the diffusion means with respect to the optical axis;

$\theta sy$: a scan angle in the second scan direction of the laser light entering the diffusion means with respect to the optical axis;

$\theta dx$: an output angle in the first scan direction of a central ray of the diffused light that is output from a scan position which corresponds to $\theta sx$ at the diffusion means with respect to the optical axis; and $\theta dy$: an output angle in the second scan direction of a central ray of the diffused light that is output from a scan position which corresponds to $\theta sy$ at the diffusion means with respect to the optical axis.

In the image display device according to the present invention, it is desirable that the diffusion means diffuses the laser light deflected by the deflection means in such a way that when the diffused laser light enters the holographic optical element, a 50% or more diffraction efficiency is obtained at the holographic optical element.

In the image display device according to the present invention, it is desirable that the diffusion means diffuses the laser light at different diffusion angles in the first scan direction and in the second scan direction.

In the image display device according to the present invention, the diffusion means may be composed of a single diffusion plate.

In the image display device according to the present invention, it is desirable that the diffusion plate is composed of a holographic optical element of a volume phase type.

In the image display device according to the present invention, it is desirable that the holographic optical element that constitutes the diffusion plate is of a reflective type.

In the image display device according to the present invention, the diffusion means may be composed of a lens and a diffusion plate.

In the image display device according to the present invention, the diffusion means may be composed by forming a diffusion surface on a surface of a Fresnel lens.

The image display device according to the present invention may have a structure to further include an optical element that is disposed in a light path between the diffusion means and the deflection means and has negative power.

The image display device according to the present invention may have a structure to meet the following condition formulas: specifically, $$\theta sx\_max > 10°, \theta sy\_max > 10° \tag{3}$$

$$1.03 < \cos(\theta dx\_max)/\cos(\theta sx\_max) < 1.15 \tag{4}$$

$$1.03 < \cos(\theta dy\_max)/\cos(\theta sy\_max) < 1.15 \tag{5}$$

where $\theta sx\_max$: a maximum value of $\theta sx$;

$\theta sy\_max$: a maximum value of $\theta sy$;

$\theta dx\_max$: a maximum value of $\theta dx$; and $\theta dy\_max$: a maximum value of $\theta dy$.

An image display device according to the present invention is an image display device that guides image light from an image generation portion to an optical pupil of an eyepiece optical system, thereby allowing an observer to observe a virtual image of an image at a position of the optical pupil, the image generation portion includes:

a laser light source;

a deflection means that deflects and scans laser light emitted from the laser light source by a reflection surface in two scan directions which are perpendicular to each other; and a diffusion plate that is disposed on an image surface of the eyepiece optical system and diffuses the laser light deflected by the deflection means;

wherein the eyepiece optical system includes a holographic optical element of a volume-phase type and of a reflective type as a combiner which diffracts and reflects the image light from the image generation portion to guide the image light to the optical pupil; and in parallel with which, transmits and guides external light to the optical pupil; and when an axis that optically connects a scan center of the reflection surface of the deflection means and a center of the optical pupil to each other is an optical axis, the image display device comprises:

a virtual-image diopter adjustment means that moves the image generation portion along the optical axis to adjust a diopter of the virtual image;

a correction lens that is disposed in a light path of the image light; and a correction lens movement means that moves the correction lens along the optical axis;

wherein as the image generation portion is moved by the virtual-image diopter adjustment means, the correction lens movement means moves the correction lens while keeping the optical pupil and the reflection surface of the deflection means in an optically conjugate positional relationship.

In the image display device according to the present invention, it is desirable that the correction lens is disposed between the deflection means and the diffusion plate.

An image display device according to the present invention is an image display device that guides image light from an image generation portion to an optical pupil of an eyepiece optical system, thereby allowing an observer to observe a virtual image of an image at a position of the optical pupil, the image generation portion includes:

a laser light source;

a deflection means that deflects and scans laser light emitted from the laser light source by a reflection surface in two scan directions which are perpendicular to each other; and a diffusion plate that is disposed on an image surface of the eyepiece optical system and diffuses the laser light deflected by the deflection means;

wherein the eyepiece optical system includes a holographic optical element of a volume-phase type and of a reflective type as a combiner which diffracts and reflects the image light from the image generation portion to guide the image light to the optical pupil; and in parallel with which, transmits and guides external light to the optical pupil; and when an axis that optically connects a scan center of the reflection surface of the deflection means and a center of the optical pupil to each other is an optical axis, the image display device comprises:

a virtual-image diopter adjustment means that moves the image generation portion along the optical axis to adjust a diopter of the virtual image; and a correction lens that is disposed between the deflection means and the diffusion plate;

wherein the optical pupil and the reflection surface of the deflection means are in an optically conjugate positional relationship; and the eyepiece optical system is a telecentric optical system.

In the image display device according to the present invention, it is desirable that the diffusion plate diffuses the laser light deflected by the deflection means in such a way that when the diffused laser light enters the holographic optical element, a 50% or more diffraction efficiency is obtained at the holographic optical element.

In the image display device according to the present invention, when of the two scan directions, a scan direction corresponding to a horizontal direction of an image that is observed at the position of the optical pupil is a first scan direction; and a scan direction corresponding to a vertical direction of the image is a second scan direction, the diffusion plate may diffuse the laser light at different angles in the first scan direction and in the second scan direction.

In the image display device according to the present invention, the diffusion angle of the laser light at the diffusion plate may be larger in the first scan direction than in the second scan direction.

The image display device according to the present invention may have a structure to further include a field-angle adjustment means that changes a filed angle of an observed image independent of the diopter adjustment by the virtual-image diopter adjustment means.

In the image display device according to the present invention, it is desirable that the holographic optical element as the combiner has positive power.

In the image display device according to the present invention, it is desirable that in an incidence plane that includes the optical axis of incident light to the holographic optical element as the combiner and the optical axis of reflection light from the holographic optical element as the combiner, an incident angle and a diffraction angle at the holographic optical element are different from each other.

A head-mounted display according to the present invention may have a structure to include: the above image display device according to the present invention; and a support means that supports the image display device in front of an observer.

A head-up display according to the present invention may have a structure to include the above image display device according to the present invention; wherein a holographic optical element as a combiner of the image display device is held by a windshield.

Advantages of the Invention

According to the present invention, the light emitted from the laser light source of the image generation portion is deflected by the reflection surface of the deflection means (e.g., a MEMS mirror) in the two scan directions; thereafter, diffracted and reflected by the holographic optical element (hereinafter, also called an HOE) of the eyepiece optical system; and guided to the optical pupil. When the observer's pupil is situated at the position of the optical pupil, by the two-dimensional deflection and scanning by the deflection means, each of the deflected rays is guided to the retina, so that the observer is able to observe a two-dimensional image as a virtual image. Besides, because the external light passes through the HOE and is guided to the optical pupil, the observer is able to observe the image and an external image at the same time.

Here, because in the image generation portion, the light after deflection by the deflection means is diffused by the diffusion means, the optical pupil is widened, so that even if the position of the observer's pupil moves around in the plane of the optical pupil, the observer is able to observe the image.

Besides, because the optical pupil and the reflection surface of the deflection means are in the optically conjugate positional relationship, it is possible to avoid deterioration of the observed image quality. In other words, thanks to the conjugate relationship, it is possible to increase use efficiency of the light supplied from the image generation portion; and the observer is able to observe a bright image at the position of the optical pupil. Moreover, thanks to the conjugate relationship, even if the observer's pupil moves around in the plane of the optical pupil, it is possible to make the image light from all of the screen regions enter the observer's pupil, so that at whichever position in the plane of the optical pupil, the observer is able to clearly (with no missing portions) observe the entire image. Especially, the HOE of the volume-phase type and of the reflective type diffracts and reflects only the light entering at a predetermined incident angle, so that it is hard to obtain a bright image; accordingly, increasing the light use efficiency by meeting the above conjugate relationship becomes very effective in the structure that uses the HOE as the combiner as in the present invention.

Besides, by meeting the condition formulas, the diffusion means has the positive power, so that even if the optical pupil and the reflection surface of the deflection means are set into the conjugate relationship, it is possible to shorten the distance between the above reflection surface and the diffusion means. Accordingly, without enlarging the image generation portion, it is possible to obtain the above advantage by achieving the above conjugate relationship.

Besides, even if the image generation portion is moved along the optical axis to adjust the diopter (display distance of a virtual image from the optical pupil) of the virtual image by means of the virtual-image diopter adjustment means, the optical conjugate relationship between the optical pupil and the reflection surface of the deflection means is kept because of the movement of the correction lens by means of the correction lens movement means, so that irrespective of the diopter of the virtual image, it is possible to avoid quality deterioration of the observed image.

In other words, thanks to the above conjugate relationship, it is possible to increase the use efficiency of the light supplied from the image generation portion, so that irrespective of the diopter of the virtual image, the observer is able to observe a bright image at the position of the optical pupil. Especially, the HOE of the volume-phase type and of the reflective type diffracts and reflects only the light entering at the predetermined incident angle, so that it is hard to obtain a bright image; accordingly, increasing the light use efficiency by meting the above conjugate relationship becomes very effective in the structure that uses the HOE as the combiner as in the present invention. Moreover, thanks to the above conjugate relationship, the principal rays that are diffracted by the HOE and output from the respective image heights, irrespective of the diopter of the virtual image, pass through a point (same point) in the plane of the optical pupil. Accordingly, even if the observer's pupil moves around in the plane of the optical pupil, it is possible to make the image light from all of the screen regions enter the observer's pupil, so that the observer is able to clearly (with no missing portions and no brightness unevenness) observe the entire image.

It is possible to obtain the above advantage in a case as well in which the optical pupil and the reflection surface of the deflection means are in the optically conjugate positional relationship and the eyepiece optical system is a telecentric optical system. In other words, if the eyepiece optical system is a telecentric optical system, it is possible to keep the optical conjugate relationship between the optical pupil and the reflection surface of the deflection means even if the correction lens is not moved along the optical axis at a time of the diopter adjustment of the virtual image by means of the virtual-image adjustment means. Accordingly, irrespective of the diopter of the virtual image, it is possible to avoid quality deterioration of the observed image.

BRIEF DESCRIPTION OF THE DRAWINGS

FIG. 4 (*b*) is a description view showing a light path when a diffusion unit is used as the above diffusion means.

FIG. 5 (*b*) is a description view showing a light path in a case where central rays after diffusion by the above diffusion unit become parallel.

BEST MODE FOR CARRYING OUT THE INVENTION

[Embodiment 1]

An embodiment of the present invention is described based on drawings as follows.

(1. Structure of HMD)

Figure 2:
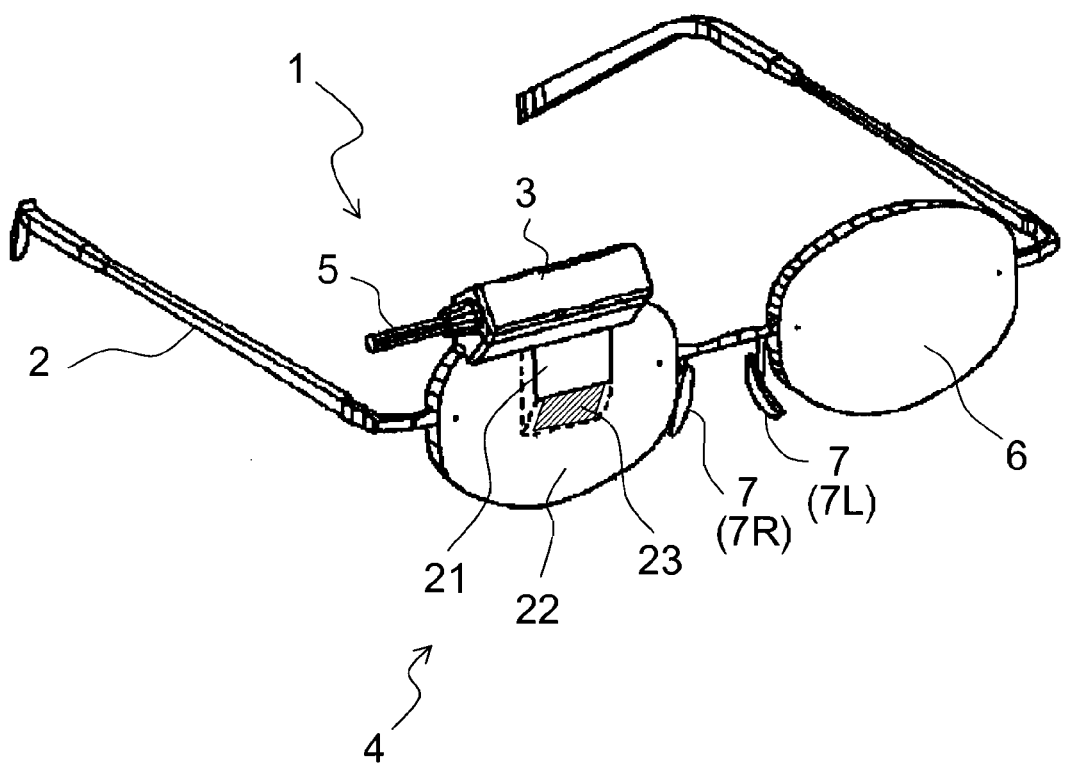
FIG. 2 is a perspective view showing a schematic structure of the above HMD.

FIG. 2 is a perspective view showing a schematic structure of an HMD according to the preset embodiment. The HMD is composed of an image display device 1 and a support member 2.

The image display device 1 generates an image, provides the image as a virtual image to an observer and allows the observer to observe an external image in a see-through way. This image display device 1 has a structure in which an eyepiece optical system 4 is unitarily formed with a housing 3 that houses an image generation portion 11 (see FIG. 1) described later. A signal and driving power for controlling each portion (e.g., a laser light source 12 and a deflection device 13 shown in FIG. 1) of the image display portion 11 are supplied to each portion via a cable 5 inserted into the housing 3. The eyepiece optical system 4, as a whole, has a shape like one lens (right-eye lens in FIG. 2) of eyeglasses. Here, a lens 6 corresponding to a left-eye lens of eyeglasses is a dummy lens.

The support member 2 is a support means for supporting the image display device 1 in front of the observer; for example, is composed of an aggregate of members corresponding to an eyeglasses frame and to a temple. By fixing this support member 2 on the head of the observer, the image display device 1 is correctly held at a position in front of the observer, so that the observer is able to stably observe an image provided from the image display device 1 without using the hands for a long time. Here, in the present embodiment, the support member 2 supports one image display device 1 corresponding to the right eye of the observer; however, may support two image display devices 1 corresponding to both eyes of the observer.

Besides, the support member 2 has a fix mechanism 7. The fix mechanism 7 is a fix means that performs position adjustment to match the position of an optical pupil (exit pupil) formed by the eyepiece optical system 4 with the position of the observer's pupil (eye pupil, iris); thereafter, fixes a relative position of the eyepiece optical system 4 with respect to the observer's head; and is so structured as to have a right-nose pad 7R, a left-nose pad 7L which come into contact with the observer's nose and movable, and a lock portion that locks them. The support means 2 has the fix mechanism 7, so that after the position adjustment of the optical pupil, the observer is able to observe a good image surely and stably at the position of the optical pupil for a long time.

(2. Structure of Image Display Device)

Figure 1:
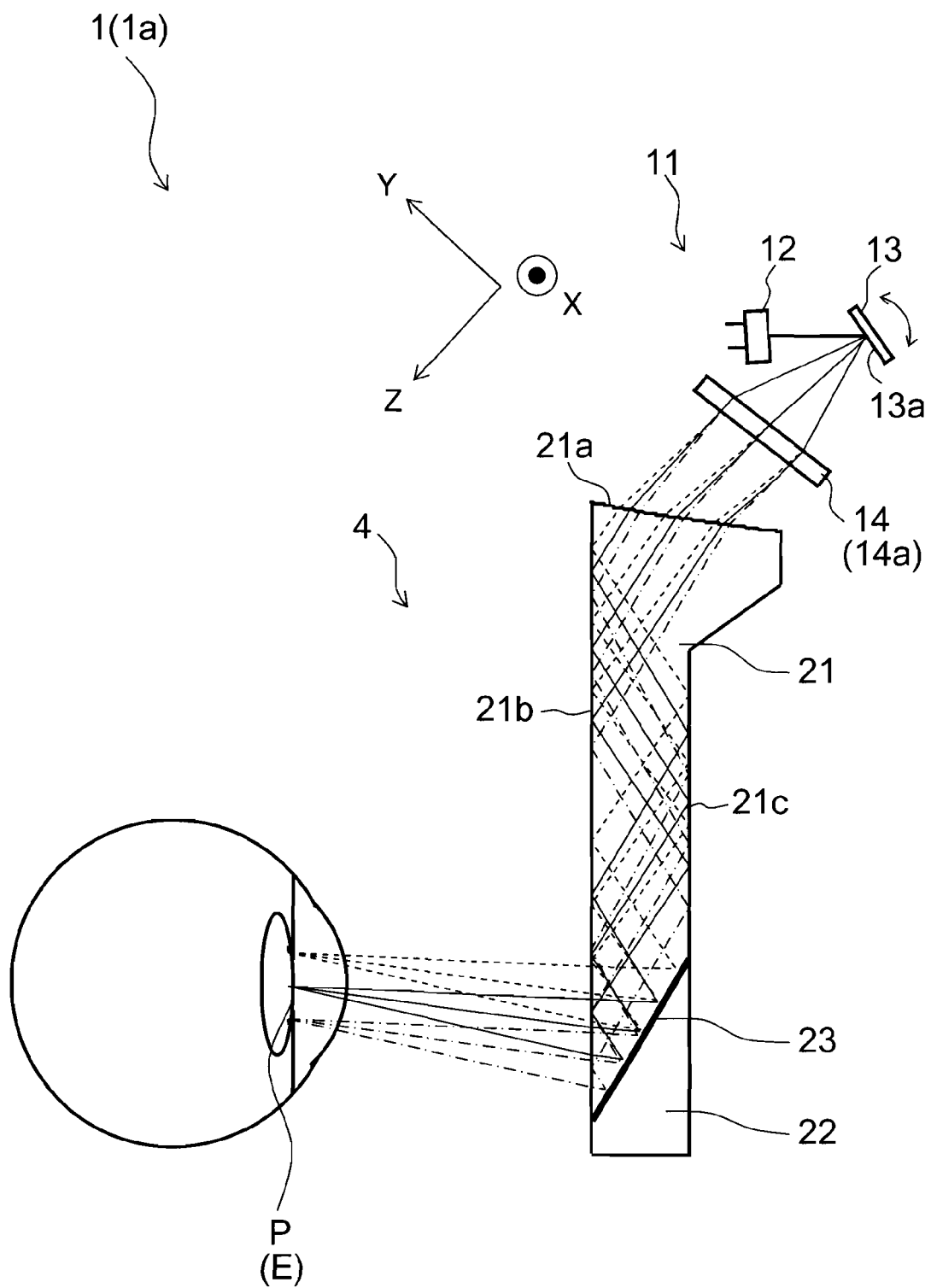
FIG. 1 is a sectional view showing a schematic structure of an image display device applied to an HMD according to an embodiment of the present invention.

Next, details of the image display device 1 are described. FIG. 1 is a sectional view showing a schematic structure of the image display device 1. As shown in the figure, the image display device 1 is so structured as to have an image generation portion 11 and the above eyepiece optical system 4; guides image light from the image generation portion 11 to an optical pupil E via the eyepiece optical system 4, thereby allowing the observer to observe a virtual image of the image at the position of the optical pupil E. Hereinafter, specific description is performed. Here, the image display device 1 in FIG. 1 is, for convenience, called an image display device 1a in some cases.

The image generation portion 11 generates an image the observer observes; and is so structured as to have: a laser light source 12; a deflection device 13; and a diffusion unit 4. The laser light source 12 emits laser light of a single color, for example.

The deflection device 13 is a deflection means that deflects and scans the laser light emitted from the laser light source 12 in two scan directions which are perpendicular to each other; in the present embodiment, is composed of a MEMS (Micro Electro Mechanical Systems) mirror that deflects and scans incident light two dimensionally, for example. The MEMS mirror rotates a reflection surface 13a by a fine angle with respect to the two axes which are perpendicular to each other, thereby deflecting and scanning the incident light two dimensionally; at this time, the incident light is reflected (the incident light is reflected at the rotation center of the reflection surface 13a) at one point on the reflection surface 13a.

Here, the deflection device 13 may have a structure in which the incident laser light is reflected by separate mirrors (reflection surfaces) to be deflected and scanned two dimensionally in the two scan directions which are perpendicular to each other. In this case, virtually, all of the scan rays are reflected as if they are reflected at one point. Here, this virtual one point (reflective virtual point) is situated on an optical axis described later.

Besides, the reflection surface 13a (especially, a point from which the light reflected by the reflection surface 13a is output) of the deflection device 13 is in an optically conjugate positional relationship with the optical pupil E (e.g., see a light path indicated by a solid line in FIG. 1). Here, the optical conjugate means a state in which the respective principal rays (rays that have the highest energy intensity at the respective scan angles) reflected at one point of the deflection means pass through one point (same point) of the plane of the optical pupil. In other words, even if the respective principal rays output from one point of the reflection surface 13a are diffused by the diffusion unit 14, they pass through one point (same point) in the plane of the optical pupil E.

Here, the deflection device 13 deflects and scans the laser light, so that the above respective principal rays reach one point of the plane of the optical pupil at different times, that is, do not collect onto the one point at the same time; however, for description convenience, in the present specification, a state in which the light seems to collect onto one point at the same time is also expressed as light collection in some cases in the present specification.

The diffusion unit 14 is a diffusion means that is disposed on an image surface of the eyepiece optical system 4 and diffuses the laser light deflected by the deflection device 13; in the present embodiment, is composed of a single diffusion plate 14a. Here, the diffusion unit 14 (here, the diffusion plate 14a) has positive power, which is described later.

The eyepiece optical system 4 is an optical system that guides the image light from the image generation portion 11 to the optical pupil E and guides external image light (external light) to the optical pupil E; and is so structured as to have: an eyepiece prism 21; a deflection prism 22; and an HOE 23.

Here, for convenience of the following description, directions are defined as follows. First, an axis that optically connects the scan center of the reflection surface 13a of the deflection device 13 to the center of the optical pupil E is defined as an optical axis and the optical-axis direction is defined as a Z direction. And, a direction perpendicular to the incidence plane of the HOE 23 is defined as an X direction; and a direction perpendicular to a ZX plane is defined as a Y direction. Here, the incidence plane of the HOE 23 refers to a plane that includes an optical axis of the incident light to the HOE 23 and an optical axis of the reflected light, that is, a YZ plane. Incidentally, here, the plus and minus of each of the X, Y and Z directions are not questioned. Here, the central ray of light flux at the scan center travels on the above optical axis.

Besides, when of the two scan directions which are perpendicular to each other in a time the deflection device 13 deflects and scans the laser light, a scan direction corresponding to a horizontal direction of an image that is observed by the optical pupil E is defined as a first scan direction; and a scan direction corresponding to a vertical direction of the image is defined as a second scan direction, the first scan direction corresponds to the X direction; and the second scan direction corresponds to the Y direction.

The eyepiece prism 21 is a light guide member that totally reflects the image light from the image generation portion 11 in the inside thereof and guides the light to the HOE 23; and together with the deflection prism 22, is composed of an acrylic resin, for example. This eyepiece prism 21 is so structured as to have a shape in which an upper end of a parallel flat plate is formed thick and a lower end is formed into a wedge shape. An upper end surface of the eyepiece prism 21 is a surface 21a as an incidence plane for the image light; and two surfaces situated in a front-back direction are surfaces 21b, 21c which are parallel to each other.

The deflection prism 22 is composed of a parallel flat plate that has substantially a U-shape when viewed in a planar way (see FIG. 2); and when attached to the lower end portion and both side-surface portions (left and right end surfaces) of the eyepiece prism 21, is unitarily formed into a single body with the eyepiece prism 21 to become substantially a parallel flat plate. The deflection prism 22 is so disposed and adhered to the eyepiece prism 21 as to sandwich the HOE 23. Accordingly, it is possible to prevent a distortion from occurring in an external image which the observer observes via the eyepiece prism 21.

In other words, for example, in a case where the deflection prism 22 is not disposed, because the external light is refracted when it passes through the wedge-shape lower end portion of the eyepiece prism 21, a distortion occurs in the external image that is observed via the eyepiece prism 21. However, the unitary and substantially parallel flat plate is formed by joining the deflection prism 22 to the eyepiece prism 21, so that it is possible to cancel the refraction, by means of the deflection prism 22, at the time the external light passes through the wedge-shape lower end portion of the eyepiece prism 21. As a result of this, it is possible to prevent a distortion form occurring in the external image that is observed in a see-through way.

The HOE 23 is a volume-phase type and reflective type of holographic optical element as a combiner which diffracts and reflects the image light from the image generation portion 11 to guide it to the optical pupil E; and at the same time, transmits the external light to guide it to the optical pupil E; and is disposed on the junction surface of the eyepiece prism 21 with the deflection prism 22. This HOE 23 has axis-asymmetrical positive power; and has the same function as that of an aspherical concave mirror that has positive power. Accordingly, it is possible to easily reduce the size of the device by increasing the degree of freedom of disposition of each optical member that constitutes the device and to provide an image whose aberration is well corrected to the observer.

Figure 3:
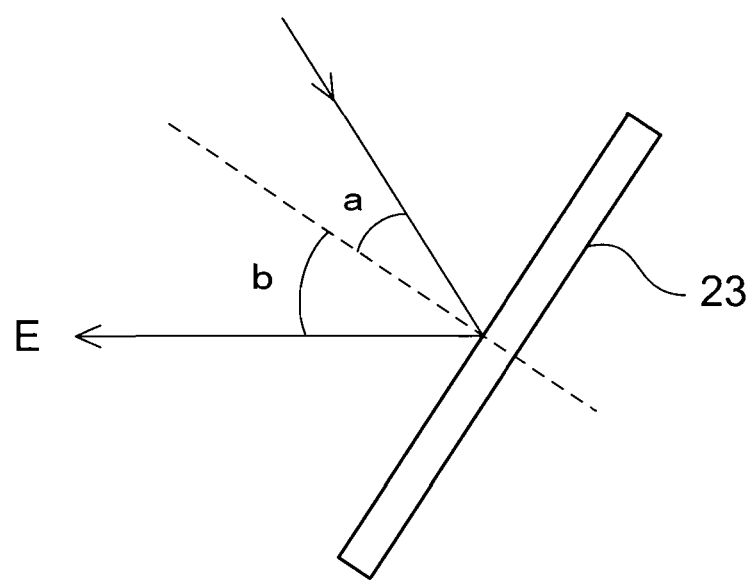
FIG. 3 is an enlarged sectional view of an HOE as a combiner of the image display device.
Figure 3:
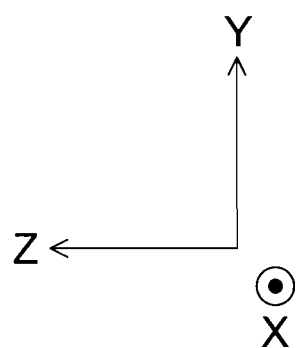

Besides, FIG. 3 is an enlarged sectional view showing the HOE 23. In the incidence plane (YZ plane) of the HOE 23, an incident angle a and a diffraction angle b of the image light at the HOE 23 are different from each other. For example, image light that enters the HOE 23 at an incident angle of 25° in the above incidence plane is diffracted and reflected at a diffraction angle of 30°. As described above, because the incident angle a and the diffraction angle b are different from each other, it is possible to separate the 0-order light that undergoes regular reflection at the HOE 23 from the normal diffraction light, so that it is possible to prevent the 0-order light from being observed as a ghost image at the position of the optical pupil E.

Next, operation of the image display device 1 having the above structure is described based on FIG. 1.

The laser light (which is collimated) emitted from the laser light source 12 of the image generation portion 11 is deflected and scanned two dimensionally by the reflection surface 13a of the deflection device 13. At this time, by means of a not-shown control portion, while modulating the intensity of the laser light in accordance with image data, by deflecting and scanning the laser light by means of the deflection device 13 in synchronization with the intensity modulation, it is possible to project an image (primary image) onto the diffusion unit 14 (diffusion plate 14a) disposed on the image surface of the eyepiece optical system 4.

The light of the projected image is diffused by the diffusion unit 14 into divergent light that has a predetermined diffusion angle; thereafter, enters the inside of the eyepiece prism 21 of the eyepiece optical system 4 via the surface 21a. The image light entering the eyepiece prism 21 is totally reflected by the surface 21b of the eyepiece prism 21 close to the observer; thereafter, is totally reflected again by the surface 21c opposite to the surface 21b, totally reflected again by the surface 21b, and reaches the HOE 23. The HOE 23 is so fabricated as to reflect only the light having the wavelength of the laser light from the laser light source 12 and the light having wavelengths very close to the wavelength of the laser light, so that the light having wavelengths other than the above wavelengths passes through the HOE 23. Accordingly, the image light that reaches the HOE 23 is diffracted and reflected by the HOE 23; thereafter, passes through the surface 21b of the eyepiece prism 21 to reach the optical pupil E.

When the observer's pupil P is situated at the position of the optical pupil E, each of the rays deflected by the deflection device 13 is guided to the observer's retina, so that the observer is able to observe in front an enlarged virtual image of the two-dimensional image that is generated by the image generation portion 11. At the same time, the light that is contained in the external light and has a wavelength different from that of the laser light passes through the HOE 23, so that the observer is able to naturally observe not only the above image but also the external image.

As described above, by using: the laser light source 12 as the light source that emits the high-brightness laser light; and the highly wave-selective HOE 23, as the combiner, that is of the volume phase type and of the reflective type, the image display device 1 according to the present invention allows the observer to observe a high-contrast image that has a good see-through characteristic.

Besides, in the image generation portion 11, because the light after the deflection by the deflection device 13 is diffused by the diffusion unit 14, it is possible to spread the optical pupil E in both directions of the X direction and the Y direction. Accordingly, because the optical pupil E having a predetermined area is obtained (because the observable point is not one), even if the position of the observer's pupil P moves around in the plane of the optical pupil E up, down, left and right, it becomes possible for the observer to observe a good image.

Besides, because the optical pupil E and the reflection surface 13a of the deflection device 13 are seemingly (even if the diffusion unit 14 is disposed) in the optically conjugate positional relationship, it is possible to prevent the observed image quality from deteriorating. In other words, thanks to the above conjugate relationship, it is possible to increase the use efficiency of the light supplied from the image generation portion 11; and the observer is able to observe a bright image at the position of the optical pupil E. Besides, if the above conjugate relationship is not satisfied, it is likely that part of the image light does not enter the observer's pupil E; and because of this, part of the image is missed and brightness unevenness occurs in the screen. However, because the above conjugate relationship is satisfied, even if the observer's pupil P moves around in the plane of the optical pupil E, it is possible to make the image light from all of the screen regions enter the observer's pupil P; and the observer is able to clearly observe the entire image. Especially, because the HOE 23 of the volume phase type and of the reflective type diffracts and reflects only the light that enters in a predetermined angle range, it is hard to obtain a bright image, so that increasing the light use efficiency by meeting the above conjugate relationship becomes very effective in the structure that uses the HOE 23 as the combiner as in the present invention.

(3. Diffusion Unit)

(3-1 Function of Diffusion Unit)

Next, details of the diffusion unit 14 are described. Here, in the following description, the central ray of the diffusion light or of the flux of rays refers to a ray (principal ray) that has the highest energy intensity in the diffusion light or the flux of rays (hereinafter, the same definition applies). Besides, the diffusion angle refers to an angle at which the light (flux of rays) output from one point spreads.

FIG. 4 (*a*) shows a light path when a general diffusion plate 101 is used as a diffusion means that diffuses laser light which is deflected by the deflection device 13. The general diffusion plate 101 diffuses, at a predetermined angle φ, rays that enter the diffusion plate 101 and outputs them; however, the central ray of the diffusion light output from each scan position of the diffusion plate 101 is output at substantially the same angle as the incident angle.

In contrast, FIG. 4 (*b*) shows a light path when the diffusion unit 14 in the present embodiment is used as the above diffusion means. In the present embodiment, the diffusion unit 14 diffuses the laser light deflected by the deflection device 13 in such a way that all of the scan positions except the scan center of an area scanned by the deflection device 13 meet the following the conditional formulas (1) and (2), that is, $$\theta sx > \theta dx \quad (1)$$

$$\theta sy > \theta dy \quad (2)$$

where θsx: a scan angle (°) in the X-direction of the laser light entering the diffusion means with respect to the optical axis Z;

θsy: a scan angle (°) in the Y-direction of the laser light entering the diffusion means with respect to the optical axis Z;

θdx: an output angle (°) in the X-direction of the central ray of the diffusion light output from a scan position corresponding to θsx at the diffusion means with respect to the optical axis Z;

θdy: an output angle (°) in the Y-direction of the central ray of the diffusion light output from a scan position corresponding to θsy at the diffusion means with respect to the optical axis Z.

Figure 4A:
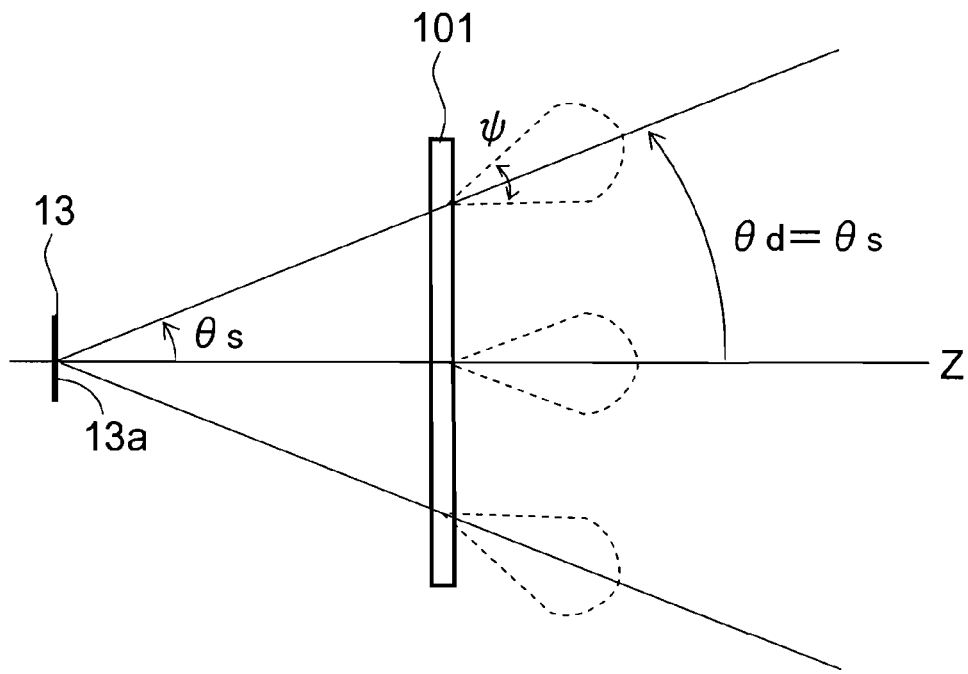
FIG. 4 (*a*) is a description view showing a light path when a general diffusion plate is used as a diffusion means that diffuses laser light which is deflected by a deflection means of the image display device.
Figure 4B:
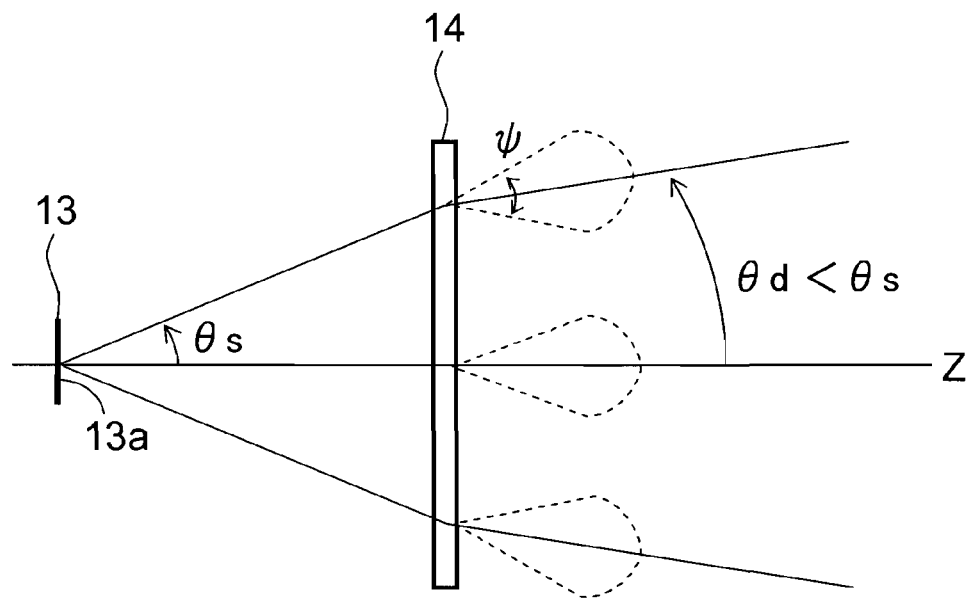

Here, the Z axis in FIG. 4*a*) and FIG. 4*b*) refers to the optical axis. Besides, θs in FIG. 4*a*) and FIG. 4*b*) is a collective name of θsx and θsy; however, in a case where the light-path view shows a light path in the ZX plane, θs indicates θsx; in a case where the light-path view shows a light path in the YZ plane, θs indicates θsy. Likewise, θd in FIG. 4*a*) and FIG. 4*b*) is a collective name of θdx and θdy; however, in a case where the light-path view shows a light path in the ZX plane, θd indicates θdx; in a case where the light-path view shows a light path in the YZ plane, θd indicates θdy. Here, as for the central ray (ray on the Z axis) of flux of rays at the scan center, θs=θd=0(°).

By meeting the above condition formulas (1) and (2), the central ray of flux of rays after the diffusion by the diffusion unit 14, in the flux of rays output from any scan position of the diffusion unit 14, is deflected at a desired angle different from the incident angle and output. In other words, the central rays of the flux of rays output from the respective scan positions of the diffusion unit 14 are so deflected as to travel to the optical pupil E of the eyepiece optical piece 4 that is set in a design time. At this time, the diffusion unit 14 may deflect the laser light from the deflection device 13 in such a way that the light paths shown in FIG. 5 (*a*), FIG. 5 (*b*) and FIG. 6 are obtained.

Figure 5A:
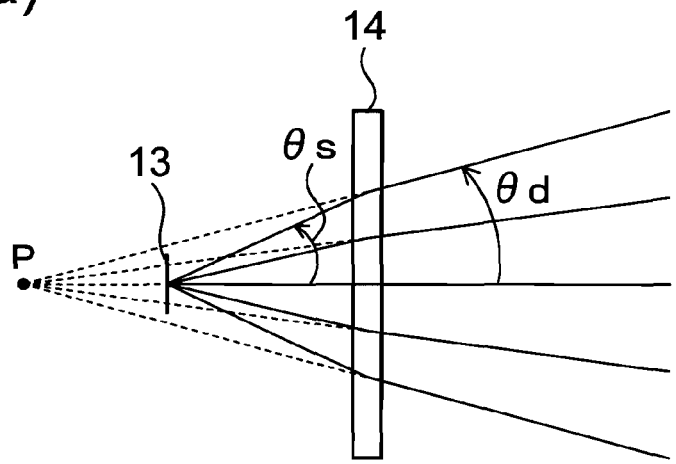
FIG. 5 (*a*) is a description view showing a light path in a case where central rays after diffusion by the above diffusion unit diverge.
Figure 5B:
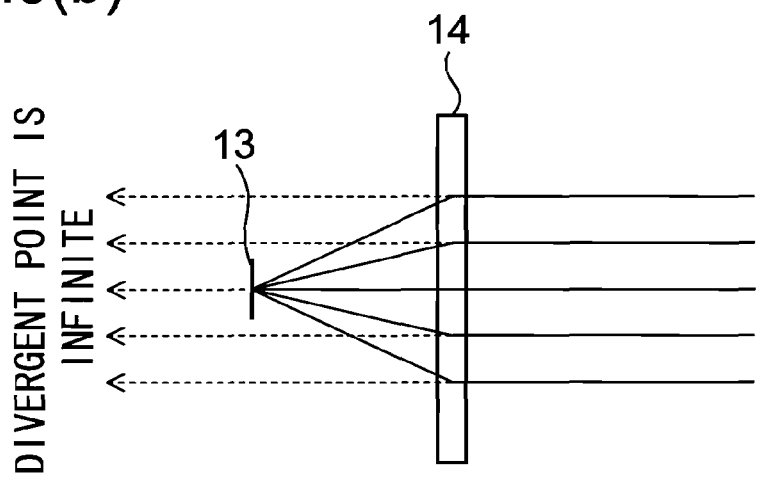
Figure 6:
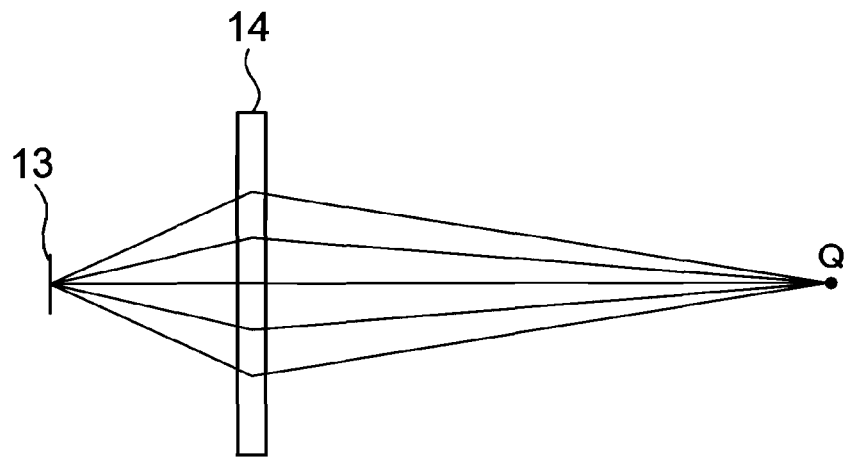
FIG. 6 is a description view showing a light path in a case where central rays after diffusion by the above diffusion unit collect.

FIG. 5 (*a*) and FIG. 5 (*b*) show a light path in a case where the central rays after the diffusion by the above diffusion unit 14 diverge; and a light path in a case where the central rays after the diffusion by the above diffusion unit 14 become parallel, respectively. Besides, FIG. 6 shows a light path in a case where the central rays collect. As shown in FIG. 5 (*a*), the diffusion unit 14 may deflect the laser light from the deflection device 13 in such a way that the central rays of the flux of rays which are deflected by the deflection device 13 and output from the respective scan positions become rays that diverge from substantially one point P. Here, when the central rays of the flux of rays are parallel, as shown in FIG. 5 (*b*), it is considerable that the divergent point is an infinite position. Besides, as shown in FIG. 6, the diffusion unit 14 may deflect the laser light from the deflection device 13 in such a way that the central rays of the flux of rays which are deflected by the deflection device 13 and output from the respective scan positions collect onto substantially one point Q.

As described above, by composing the diffusion unit 14 that meets the condition formulas (1) and (2), the diffusion unit 14 has the positive power, so that even if the optical pupil E and the reflection surface 13*a* of the deflection device 13 are in the conjugate relationship, it is possible to shorten the distance between the reflection surface 13*a* and the diffusion unit 14. Accordingly, without enlarging the image generation portion 11, it is possible to achieve the above conjugate relationship and to avoid quality deterioration of the observed image.

(3-2 Fabrication Method of Diffusion Unit)

It is possible to compose the above diffusion unit 14, as shown in FIG. 1, by means of the single diffusion plate 14*a*. This diffusion plate 14*a* includes an HOE that is of the volume phase type and of a transmissive type. It is possible to fabricate the HOE of the transmissive type by: making reference light and object light enter a base plate, from the same side, to which a hologram photosensitive material is applied (or attached) and making both light interfere with each other; and by recording the interference fringes as refractive-index modulation onto the hologram photosensitive material. As the above hologram photosensitive material, it is possible to use, for example, photopolymer, silver salt emulsion, bichromate gelatin, and bacteriorhodopsin; among others, it is desirable to use the photopolymer with which the HOE 23 is easily producible by using dry process. Hereinafter, a fabrication method of the diffusion plate 14*a* which includes the transmissive type HOE is described specifically.

Figure 7:
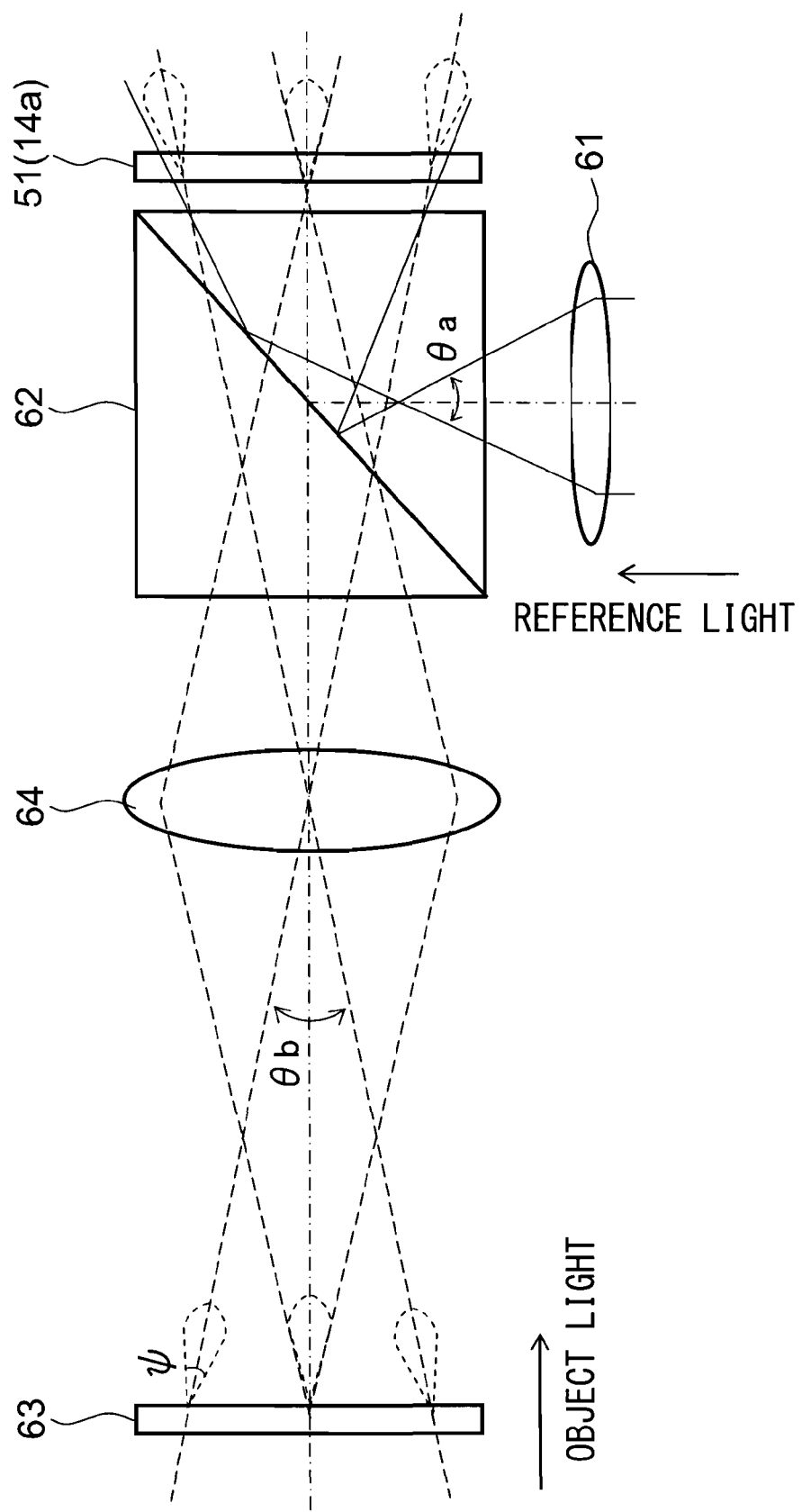
FIG. 7 is a description view schematically showing a structure of a fabrication optical system that fabricates a diffusion plate which constitutes the above diffusion unit.

FIG. 7 schematically shows a structure of a fabrication optical system that fabricates the diffusion plate 14*a* which includes the transmissive type HOE. First, a hologram base plate 51 on which the hologram photosensitive material is formed is disposed in the light path. And, the reference light is collected by a collection lens 61 and made to diverge at a divergent angle θa(°) to turn into divergent light; the divergent light is reflected by a prism combiner 62 and directed to the hologram base plate 51. Here, when the maximum value of the scan angle of the laser light entering the diffusion plate 14*a* with respect to the optical axis is defined as θs_max (°), the divergent angle θa corresponds to 2×θs_max.

On the other hand, the object light is made to enter the prism combiner 62 via a diffusion plate 63 and a relay lens 64 and to pass through there to be directed to the hologram base plate 51. At this time, the diffusion angle of the diffusion light output from the respective positions of the diffusion plate 63 is φ(°); and the respective central rays of the diffusion light from each position pass through the center of the relay lens 64. Here, when an angle two times an angle between the outermost central ray of the central rays of the diffusion light from the respective positions of the diffusion plate 63 and the optical axis of the relay lens 64 is define as θb(°); and the maximum value of the output angle of the central ray of the laser light output from the diffusion plate 14a with respect to the optical axis is defined as θd_max(°), the angle θb corresponds to 2×θd_max.

As described above, the reference light and the object light are directed to the hologram base plate 51; are made to interfere with each other; and the interference fringes are recorded onto the hologram photosensitive material, so that it is possible to obtain the diffusion plate 14a that includes the transmissive type HOE.

By composing the diffusion unit 14 by means of the diffusion plate 14a that is fabricated as described above, that is, by composing the diffusion means by means of one diffusion plate 14a, it is possible to simplify the structure of the image generation portion 11. Besides, as described later, it is also possible to compose the diffusion means by means of two members, that is, a lens and a diffusion plate; however, compared with such a structure, the above lens disposition is not limited for the purpose of avoiding interference with other members, so that it is possible to increase the degree of freedom of the design.

(3-3 Setting of Diffusion Angle)

Figure 8:
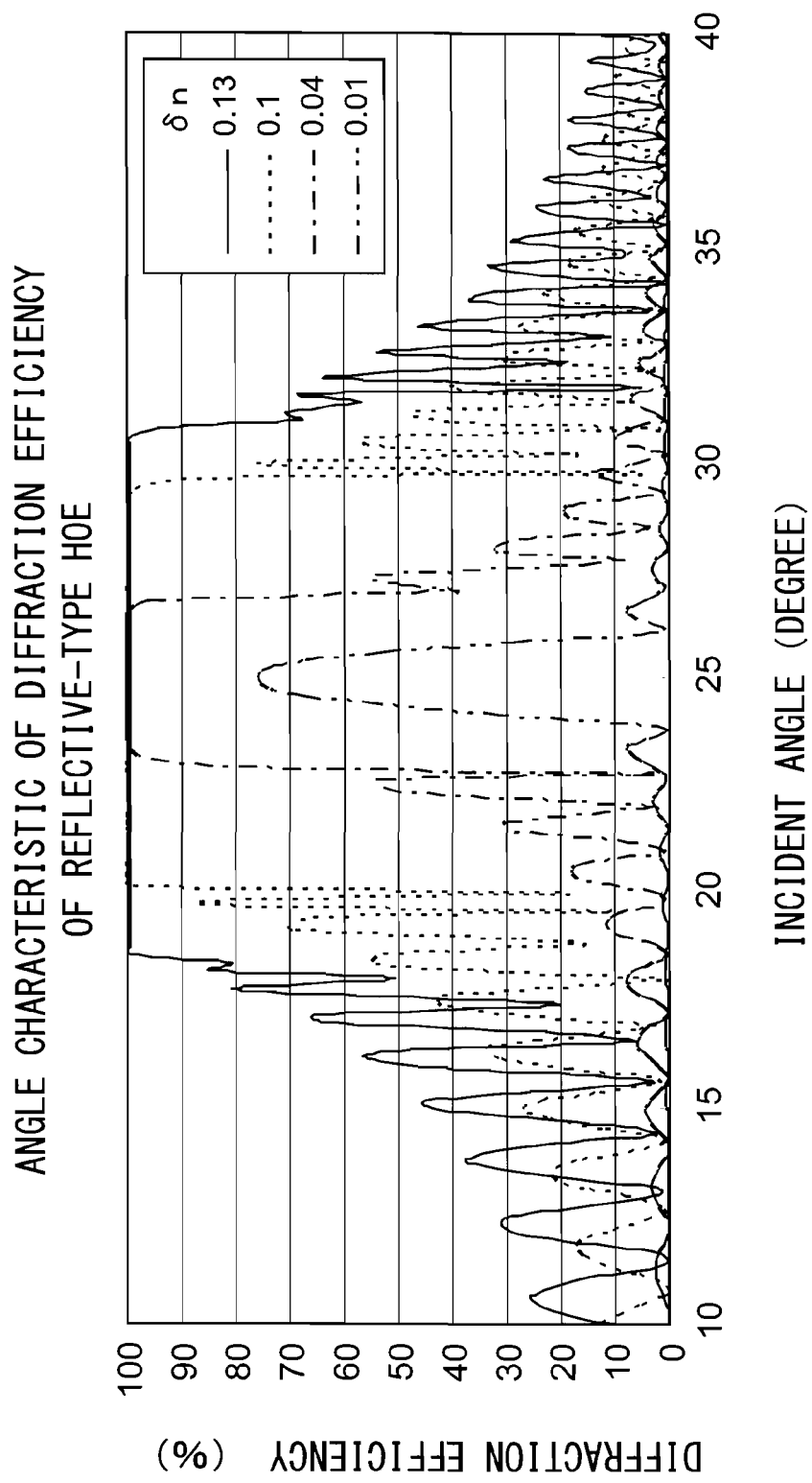
FIG. 8 is a graph showing an angle characteristic of diffraction efficiency of an HOE as the above combiner.

Next, setting of the diffusion angle φ at the diffusion unit 14 is described. The diffusion angle φ of the diffusion unit 14 is set by considering an angle characteristic of the diffraction efficiency of the HOE 23 that is the combiner. Here, FIG. 8 is a graph showing the angle characteristic of the diffraction efficiency of the HOE 23 that is of the volume phase type and of the reflective type. Incidentally, here, the HOE 23 is fabricated in such a way that the diffraction efficiency becomes maximum when the laser light enters the HOE 23 at an incident angle of 25°; and the laser light that is diffracted and reflected is output at an output angle of 30°. Besides, the refractive index of the hologram photosensitive material (HOE 23) is 1.5 and the film thickness is 20 μm.

The HOE 23 of the reflective type is fabricated by: forming the hologram photosensitive material (e.g., photopolymer) on the eyepiece prism 21; thereafter, directing two lines of light flux to the hologram photosensitive material from the eyepiece prism 21 side and from the opposite side; and recording the interference fringes produced by the interference of the two lines of light flux into the hologram photosensitive material. In accordance with the kind, light-exposure conditions and the like of the employed hologram, the refractive-index modulation δn has a value of about 0.01 to 0.13. FIG. 8 shows the angle characteristic of the diffraction efficiency of the HOE 23 that has the typical refractive-index modulation δn.

From this figure, it is possible to say that if the incident angle to the HOE 23 is in a range of 25±0.6°, 25±2.5°, 25±6°, and 25±7.5° when the refractive-index modulation δn is 0.01, 0.04, 0.1, and 0.13, it is possible to achieve a 50% or more diffraction efficiency at the HOE 23. Accordingly, in the present embodiment, the diffusion angle φ of the diffusion unit 14 is set in such a way that such incident angle ranges are obtained.

Thanks to such setting of the diffusion angle φ, it is possible to achieve the 50% or more diffraction efficiency at the HOE 23, so that it is possible to increase the light use efficiency at the HOE 23. In other words, by obtaining the 50% or more diffraction efficiency at the HOE 23, it is possible to allow the observer to observe a bright image. Besides, if the laser light is made to enter the HOE 23 at an angle at which the diffraction efficiency is low, light (0-order light) that is not diffracted turns into ghost light and the image quality deteriorates; however, because it is possible to achieve the 50% or more diffraction efficiency at the HOE 23, it is possible to avoid deterioration of the image quality caused by the ghost light.

From the above description, it is possible to say that when the diffused laser light enters the HOE 23, the diffusion unit 14 diffuses the laser light deflected by the deflection device 13 in such a way that the 50% or more diffraction efficiency is obtained at the HOE 23.

(3-4 Another Structure of Diffusion Unit)

In the above description, the example in which the diffusion unit 14 is composed of the single diffusion plate 14a is described; however, it is possible to employ the following structures.

Figure 9:
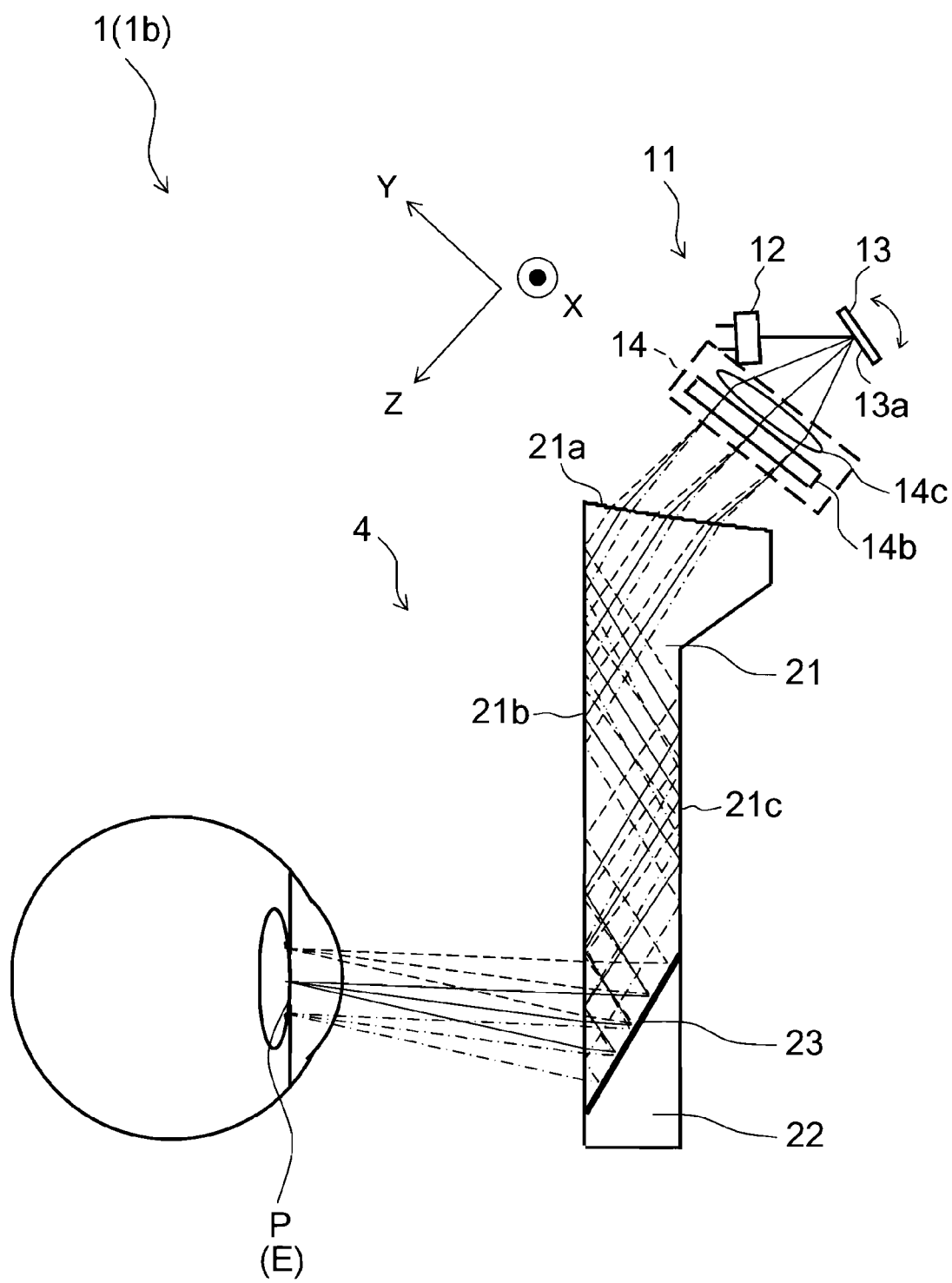
FIG. 9 shows another structure of the above image display device, that is, is a sectional view showing another structure of the diffusion unit.

FIG. 9 shows another structure of the image display device 1, that is, is a sectional view showing another structure of the diffusion unit 14. Here, the image display device 1 in FIG. 9, for convenience, is called an image display device 1b in some cases. In this image display device 1b, the diffusion unit 14 is composed of: a diffusion plate 14b; and a field lens 14c. The diffusion plate 14b, unlike the diffusion plate 14a, is a general diffusion plate that does not have the positive power. On the other hand, the field lens 14c has the positive power. As described above, the diffusion unit 14 is composed by combining such general diffusion plate 14b and the field lens 14c, so that it is possible to easily achieve the diffusion means.

Figure 10:
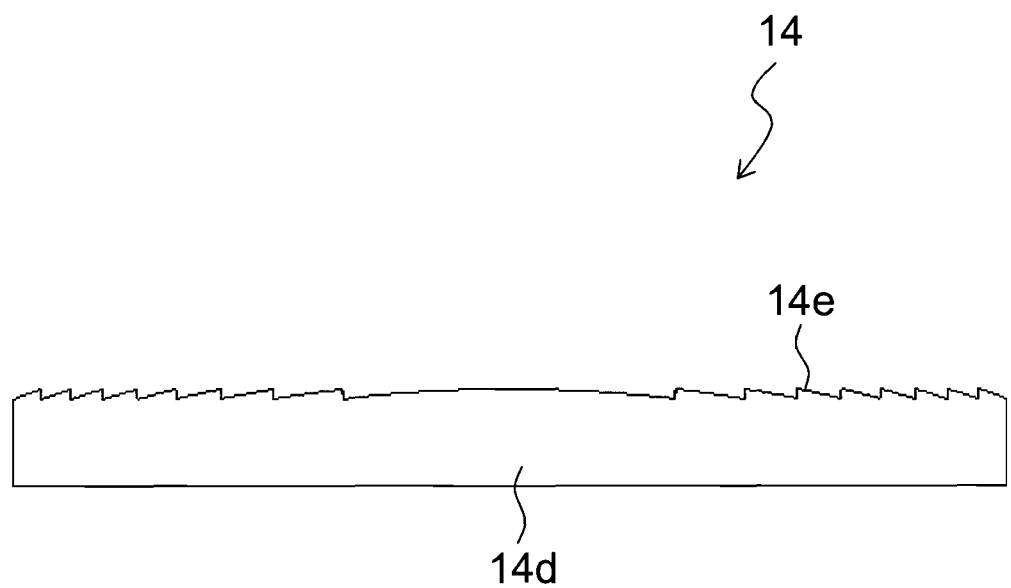
FIG. 10 is a sectional view showing still another structure of the above diffusion unit.

Besides, FIG. 10 is a sectional view showing still another structure of the diffusion unit 14. As in the present embodiment, in a case where a single-color light source is used as the laser light source 12, the diffusion unit 14 may be composed of an optical element in which a diffusion surface 14e is formed on a surface of a Fresnel lens 14d (blaze-type deflection diffraction element). It is possible to compose the diffusion unit 14e by means of, for example, a concave-convex surface. As described above, by composing the diffusion unit 14 by means of the above optical element, it is possible to fabricate the diffusion means by forming at low cost. Besides, compared with the structure in FIG. 9, it is possible to reduce the thickness of the diffusion unit 14. Here, the diffusion surface 14e may be an optical thin film that has a function to diffuse light.

(4. Others)

For example, in the structure in which the central ray of the flux of rays at the scan center from the deflection device 13 enters the diffusion unit 14 perpendicularly, in a case where the refractive-index modulation δn of the HOE that constitutes the diffusion plate 14a of the diffusion unit 14 is small; and the energy of the 0-order light is large, the ghost light of the 0-order light is likely to reach the observer's eye. Because of this, to prohibit the ghost light of the 0-order light from reaching the observer's eye, for example, each constituent member may be disposed in such a way that the central ray of the flux of rays at the scan center obliquely enters the diffusion unit 14. In such a structure as well, it is possible to satisfy the above condition formulas (1) and (2) at all of the scan positions except the scan center.

In the fabrication optical system that fabricates the HOE 23 as the combiner, it is desirable that of the two lines (reference light, object light) of light flux to which the hologram photosensitive material is exposed, the position of a point light source which generates the light flux that enters from the eyepiece prism 21 (optical pupil side) side is disposed at a position of the optical pupil or at a position on the optical axis opposite to the hologram photosensitive material from the optical pupil position with respect to the optical pupil position. In a case where the HOE 23 is fabricated with the point light source disposed at the optical pupil position, if the observer's pupil is disposed at the center of the optical pupil in a time of image observation, the observer is able to observe a good image (virtual image) that does not have brightness unevenness and color unevenness. On the other hand, in a case where the HOE 23 is fabricated with the above point light source disposed at the position which is opposite to the hologram photosensitive material with respective to the optical pupil position, even if the observer's pupil is situated at a position that is dislocated from the center in the plane of the optical pupil in a time of the image observation, the observer is able to observe the image.

In the present embodiment, the laser light source 12 is used as the light source; however, to reduce so-called laser speckle that is caused by the interference of the laser light, it is desirable to vibrate the diffusion unit 14 in the plane at an amplitude of a few micrometers or smaller and at a high speed (e.g., 50 Herz or higher).

[Embodiment 2]

Another embodiment of the present invention is described based on drawings as follows. Here, for convenience of the following description, the same structures as the embodiment 1 are indicated by the same member numbers and description of them is skipped.

(Whole Structure)

Figure 11:
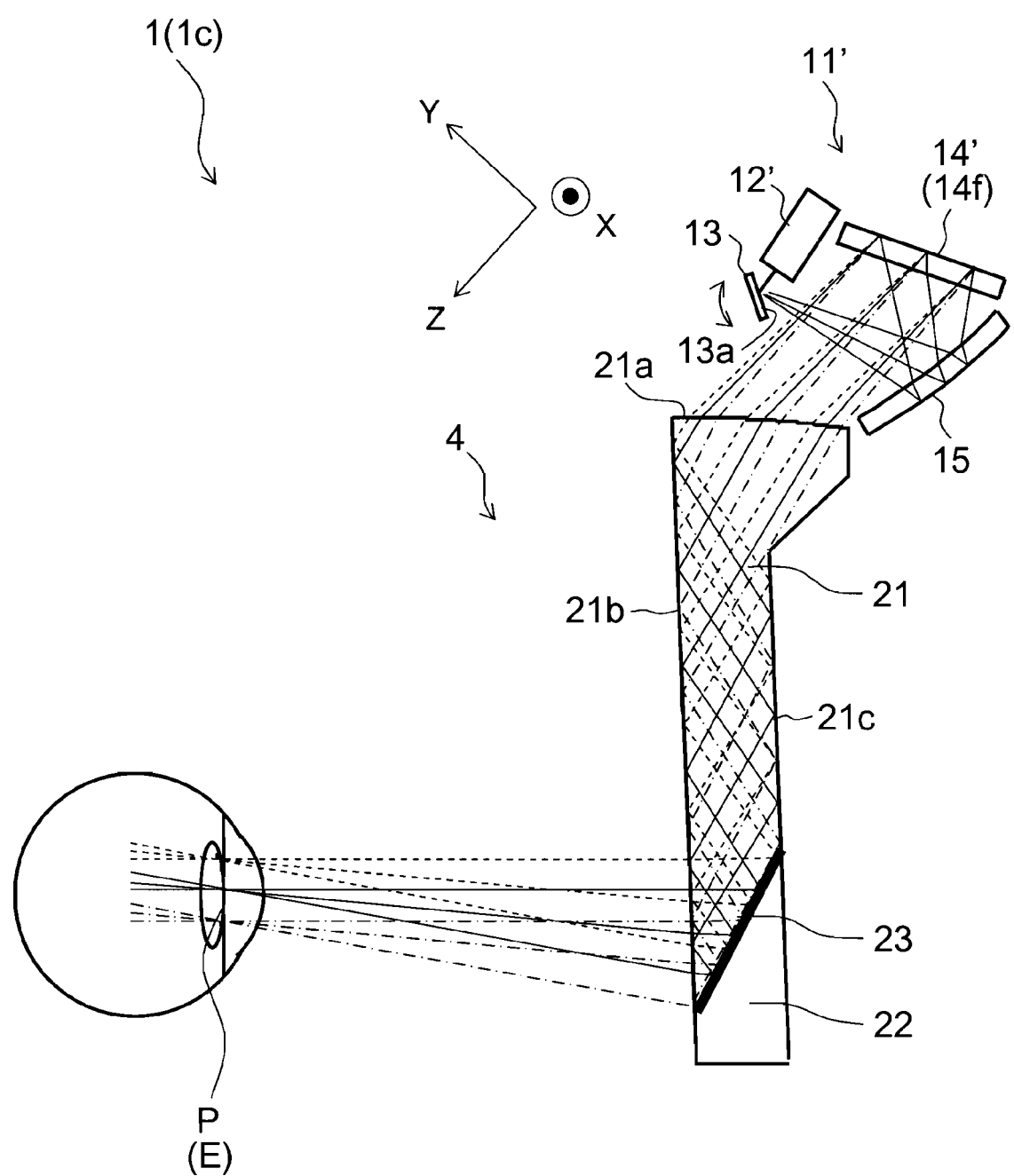
FIG. 11 is a sectional view showing a schematic structure of an image display device according to another embodiment of the present invention.

FIG. 11 is a sectional view showing a schematic structure of the image display device 1 according to the present embodiment. This image display device 1 has the same structure as the embodiment 1 except that the image generation portion 11 in the embodiment 1 is replaced with an image generation portion 11'. The image generation portion 11' has: a laser light source 12'; the deflection mirror 13; a reflection mirror 15; and a diffusion unit 14'. Here, the optical pupil E and the reflection surface 13a of the deflection device 13 are in an optically conjugate positional relationship with each other, which is the same as the embodiment 1. Here, the image display device 1 in FIG. 11 is, for convenience, called an image display device 1c in some cases.

Figure 12:
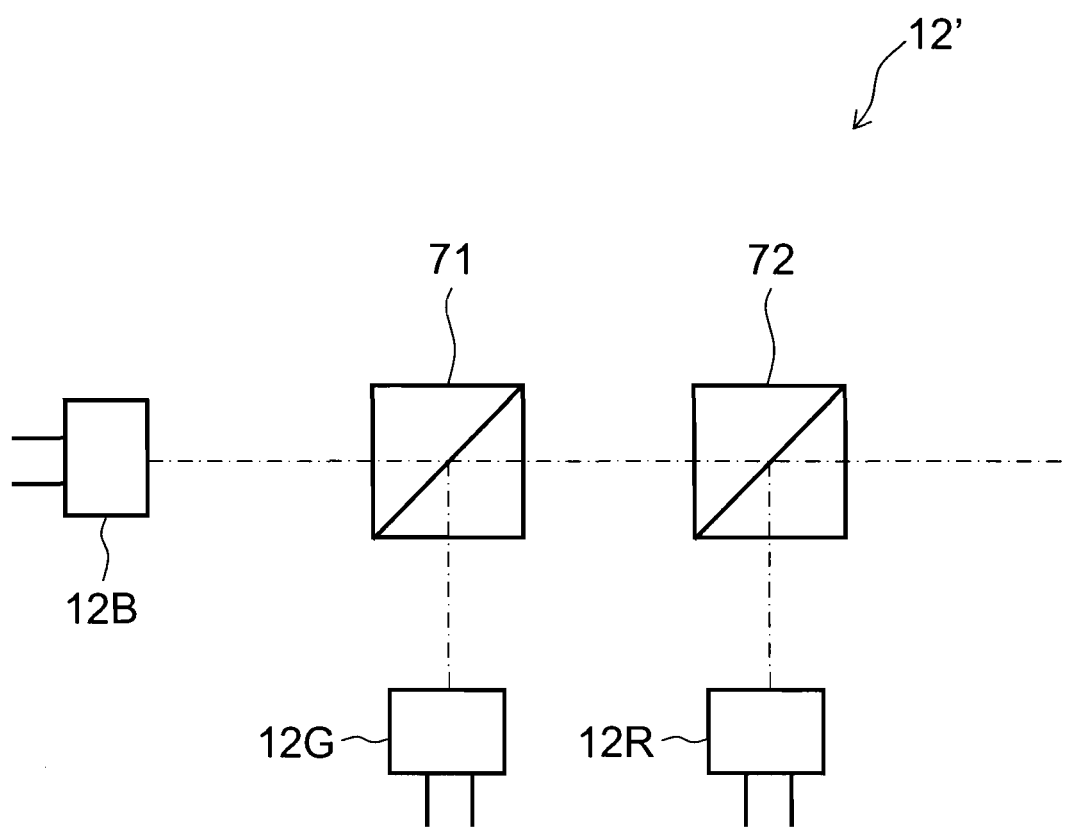
FIG. 12 is a description view showing a detailed structure of a laser light source of the above image display device.

The laser light source 12' is a color laser light source unit that emits laser light of three colors of R (red), G (green), and B (blue). Here, FIG. 12 shows a detailed structure of the laser light source 12'. The laser light source 12' has: light sources 12R, 12G, and 12B that emit the laser light of R, G, and B, respectively; and dichroic prisms 71, 72.

In the laser light source 12', the light path of the G light from the light source 12G and the light path of the B light from the light source 12B are combined by the dichroic prism 71. Besides, the light path of the R light from the light source 12R is combined, by the dichroic prism 72, with the light path of the G light and the B light from the dichroic prism 71. As a result of this, the laser light of the three colors is successively emitted with collimated from the laser light source 12' in one light path.

Here, the wavelengths (used wavelengths, reconstructed wavelengths) of the laser light of R, G, and B emitted from the laser light source 12' are, for example, 650 nm, 532 nm, and 476 nm, respectively. Incidentally, the exposure wavelengths (fabrication wavelengths) of R, G, and B for the fabrication of the HOE 23 as the combiner are, for example, 647.5 nm, 532 nm, and 476 nm, respectively. In other words, the used wavelengths from the laser light source 12' and the exposure wavelengths for the fabrication of the HOE 23 match with or close (substantially match) to each other. Besides, in the present embodiment, to be compatible with color display, the HOE 23 is fabricated by: performing multiple exposure of a one-layer hologram photosensitive material, which is sensitive to the three colors of R, G, and B, to the laser light of R, G, and B; or by performing exposure of a three-layer laminate of hologram photosensitive materials, which correspond to the respective wavelengths, to the respective laser light.

The reflection mirror 15 reflects the laser light entering via the deflection device 13 from the laser light source 12' and guides the laser light to the diffusion unit 14'. The reflection mirror 15 is composed of, for example, a plane mirror; and may be provided with power. In other words, as described after, the diffusion unit 14' has the positive power; however, it is also possible to make the reflection mirror 15 have part of this power.

The diffusion unit 14' is formed into the reflective type by means of the diffusion unit 14 in the embodiment 1; and disposed on the image surface of the eyepiece optical system 4. The diffusion unit 14' has the same function as the function of the diffusion unit 14 that is described in the embodiment 1; and in the present embodiment, is composed of one diffusion plate 14f. Here, details of the diffusion plate 14' are described later.

In the above structure, the laser light from the laser light source 12' is deflected and scanned two dimensionally by the diffusion device 13; thereafter, reflected by the reflection mirror 15 and the light path is folded; and enters the diffusion unit 14'. In the diffusion unit 14', the entering laser light is reflected and diffused at the same time; and enters the eyepiece optical system 4. The subsequent operation is the same as the embodiment 1.

As described in the present embodiment, by means of the reflection mirror 15 and the reflective-type diffusion unit 14', it is possible to cross the light path (light path from the laser light source 12' to the reflection mirror 15) of the laser scan optical system in the image generation portion 11' and the light path from the diffusion unit 14' to the eyepiece optical system 4 on each other. Accordingly, it is possible to dispose the eyepiece optical system 4 close to the laser light source 12' and to the deflection device 13, so that it is possible to reduce the size of the image generation portion 11'.

However, as described above, in the structure in which the light path is folded in the image generation portion 11', because the projection by the laser scan onto the diffusion unit 14' becomes an oblique projection, the image projected onto the diffusion unit 14' (image surface) has a trapezoidal deformation. In this case, another trapezoidal deformation for canceling this trapezoidal deformation is contained the original image data; and the laser light is modulated based on the data, so that it is possible to correct the trapezoidal deformation due to the oblique projection onto the diffusion unit 14'.

(Diffusion Unit)

Figure 13:
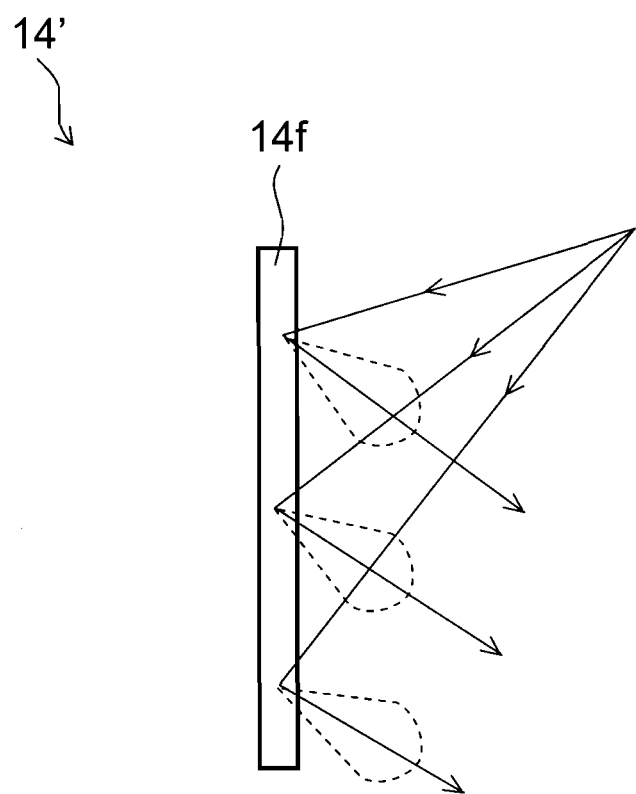
FIG. 13 is an enlarged sectional view showing a diffusion unit of the above image display device.

Next, the diffusion unit 14' in the present embodiment is described. FIG. 13 is an enlarged sectional view of the diffusion unit 14'. In the present embodiment, the diffusion plate 14f that constitutes the diffusion unit 14' is a diffusion plate which has the positive power; and is composed of, for example, an HOE that is of the volume phase type and of the reflective type. The central rays of the flux of rays output from the respective scan positions of the diffusion plate 14f are collected and at the same time, diffused at a predetermined diffusion angle and travel to the eyepiece optical system 4; and in the present embodiment as well, meet the condition formulas (1) and (2) represented in the embodiment 1.

Figure 14:
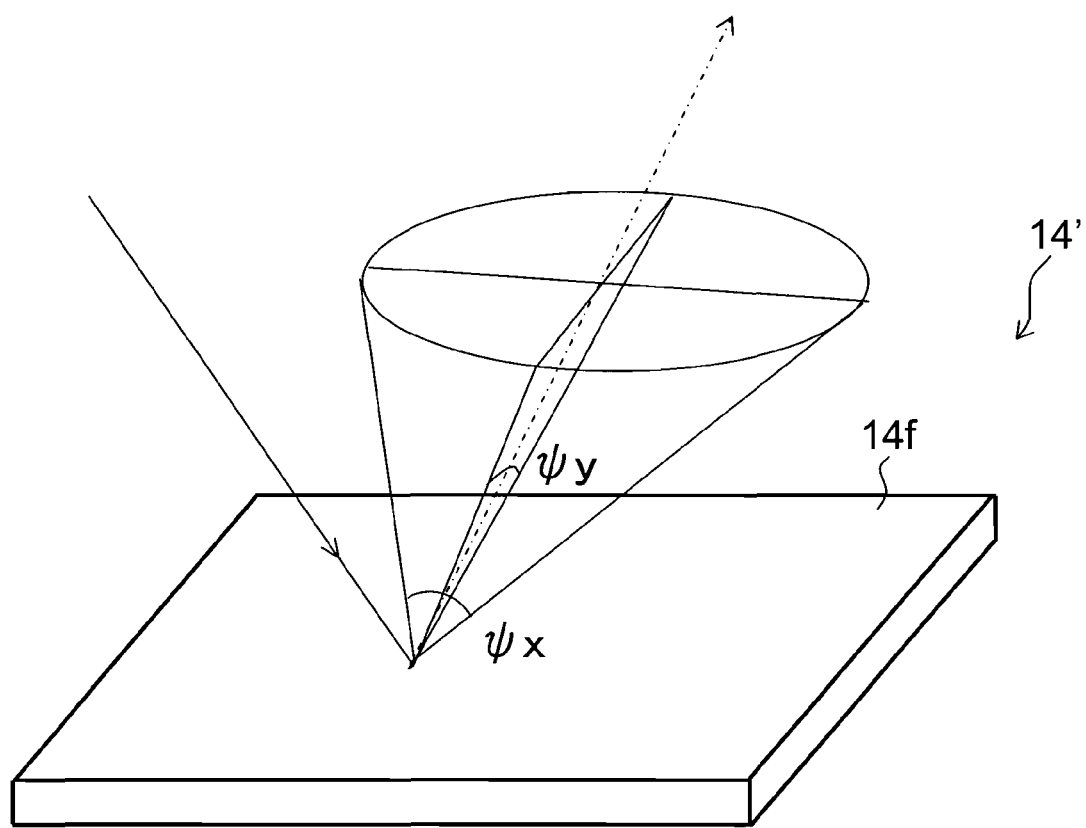
FIG. 14 is a perspective view schematically showing light diffused by a diffusion plate that constitutes the above diffusion unit.

However, in the present embodiment, the diffusion angle (diffusion characteristic) of the diffusion plate 14f has anisotropy. FIG. 14 is a perspective view schematically showing the light diffused by the diffusion plate 14f. When the diffusion angle in the X direction is $\phi x(°)$; and the diffusion angle in the Y direction is $\phi y(°)$, $\phi x > \phi y$ is satisfied in the present embodiment.

As described above, the diffusion unit 14' (diffusion plate 141) diffuses the laser light, which is output from the respective scan positions, at different diffusion angles in the X direction and the Y direction, so that it is possible to make the size of the optical pupil E different in the X direction (horizontal direction) and in the Y direction (vertical direction); and it is possible to obtain the optical pupil E that is long laterally or the optical pupil E that is long longitudinally. In a case where the optical pupil E is long laterally, because the light (laser light) is collected in the vertical direction, it is possible to allow the observer to observe a bright image; while because the optical pupil E is wide in the horizontal direction, it is possible to easily satisfy a plurality of observers who have different distances between the eyes. Besides, in a case where the optical pupil E is long longitudinally, for example, when the image display device 1 according to the present embodiment is applied to an HUD, it is possible to easily satisfy a plurality of observers who have different sitting heights.

Figure 15:
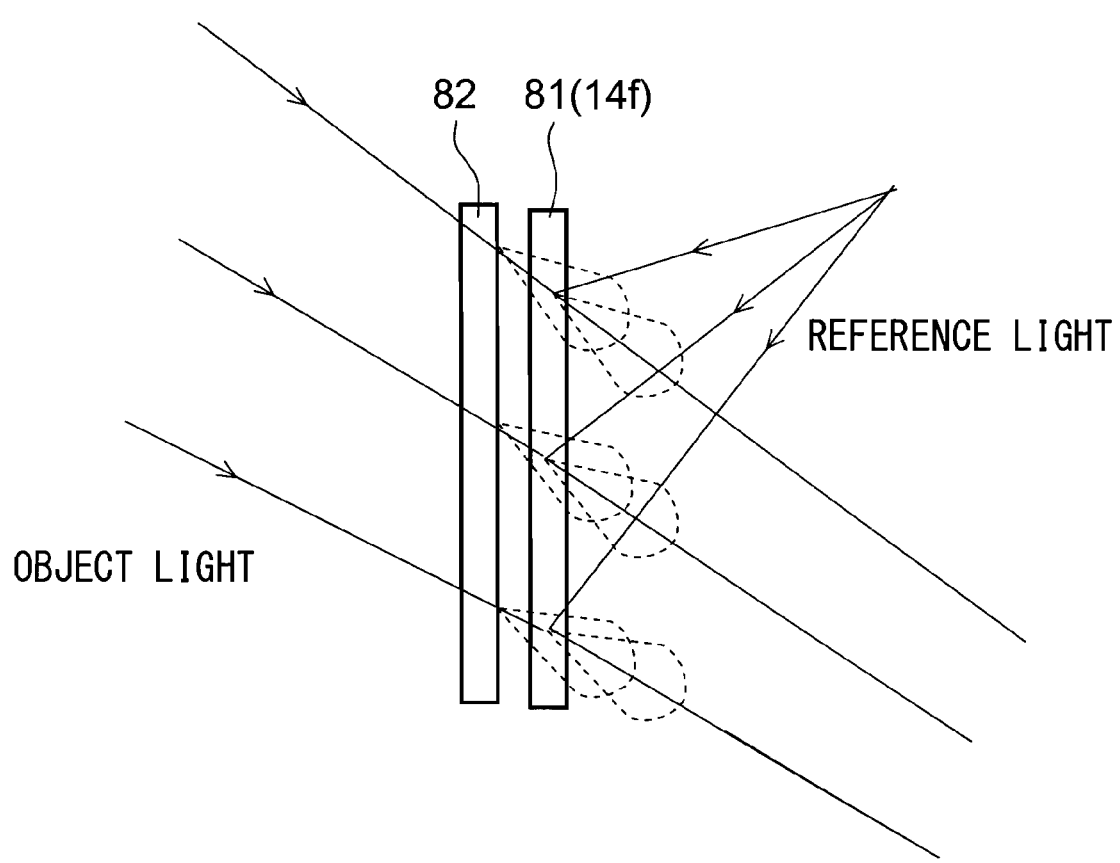
FIG. 15 is a description view schematically showing a fabrication optical system that fabricates the above diffusion plate.

The above diffusion plate 14f of the reflective type is able to be fabricated as follows. FIG. 15 schematically shows a fabrication optical system that fabricates the diffusion plate 14f. The diffusion plate 14f that includes the HOE of the volume phase type and of the reflective type is fabricated by: forming the hologram photosensitive material (e.g., photopolymer) on the base plate to obtain a hologram base plate 81; thereafter, directing two lines of light flux (reference light, object light) to the hologram base plate 81 from both sides; and recording the interference fringes produced by the interference of the two lines of light flux into the hologram photosensitive material.

In other words, in FIG. 15, the divergent light from the point light source that is the reference light is made to enter the hologram base plate 81 from the right side; while the object light is made to enter the hologram base plate 81 from the left side via the diffusion plate 82, so that the interference fringes produced by the interference of the two lines of light flux are recoded into the hologram photosensitive material. If the diffusion characteristic of the diffusion plate 82 has anisotropy, it is possible to obtain the object light that diffuses in a desired direction and at a desired diffusion angle; and by means of the interference of the object light and the reference light, it is possible to obtain the diffusion plate 14f shown in FIG. 14 that includes the HOE which has the anisotropic diffusion characteristic.

Here, in a case where the laser light source 12' compatible with color is used, like the fabrication of the HOE 23 as the combiner, the diffusion plate 14f that includes the HOE is fabricated by: performing multiple exposure of a one-layer hologram photosensitive material, which is sensitive to the three colors of R, G, and B, to the laser light of R, G, and B; or by performing exposure of a three-layer laminate of hologram photosensitive materials, which correspond to the respective wavelengths, to the respective laser light.

As described above, in the present embodiment, the diffusion plate 14f that constitutes the diffusion unit 14' is composed of the volume phase type HOE. Because the HOE, as described above, is able to be fabricated by means of the multiple exposure, it is possible to achieve the diffusion plate (diffusion means) that independently acts on a plurality of wavelengths. In other words, even in the case where the laser light source 12' emitting the laser light of a plurality of wavelengths is used as in the present embodiment, it is possible to independently diffuse the laser light of the respective wavelengths.

Besides, because the HOE that constitutes the diffusion plate 14f is of the reflective type, in the image generation portion 11', it is possible to employ the structure in which the light path is folded by the diffusion plate 14f; and it is also possible to reduce the size of the image generation portion 11' and of the image display device 1.

[Embodiment 3]

Still another embodiment of the present invention is described based on drawings as follows. Here, for convenience of the following description, the same structures as the embodiments 1 and 2 are indicated by the same member numbers and description of them is skipped.

Figure 16:
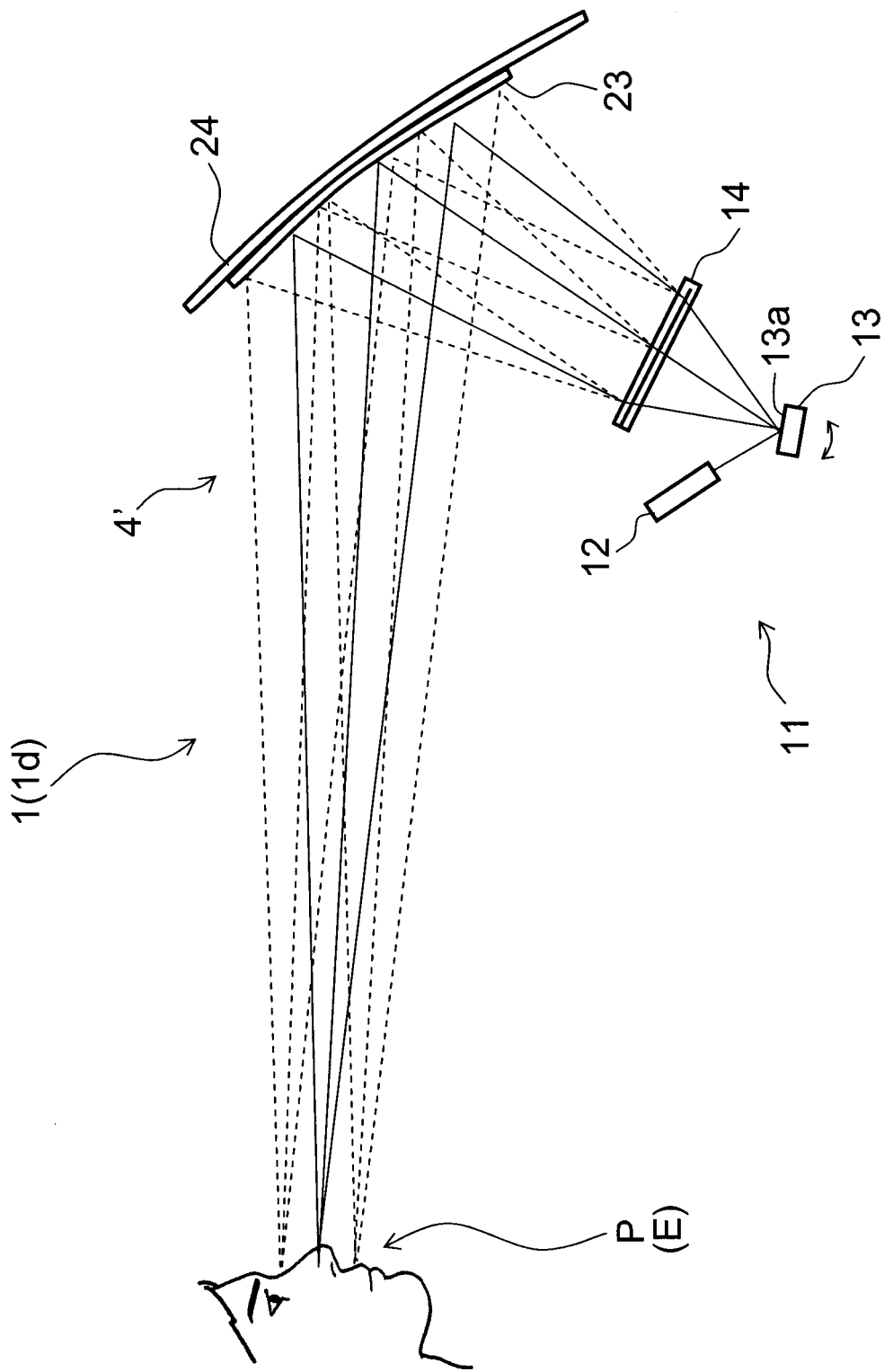
FIG. 16 is a description view showing a schematic structure of an HUD according to still another embodiment of the present invention.

FIG. 16 is a description view showing a schematic structure of an HUD according to the present embodiment. This HUD includes the image display device 1 (1d). The image display device 1d is composed by combining the image generation portion 11 of the image display device 1a according to the embodiment 1 and an eyepiece optical system 4'. The eyepiece optical system 4' is composed by fixing the HOE 23 in the embodiment 1 to a windshield 24. The windshield 24 corresponds to, for example, a windshield in front of the driver's seat in transportation means such as vehicles, ships, trains, airplanes and the like. Here, the optical pupil E and the reflection surface 13a of the deflection device 13 are in an optically conjugate positional relationship with each other, which is the same as the embodiment 1.

Figure 17:
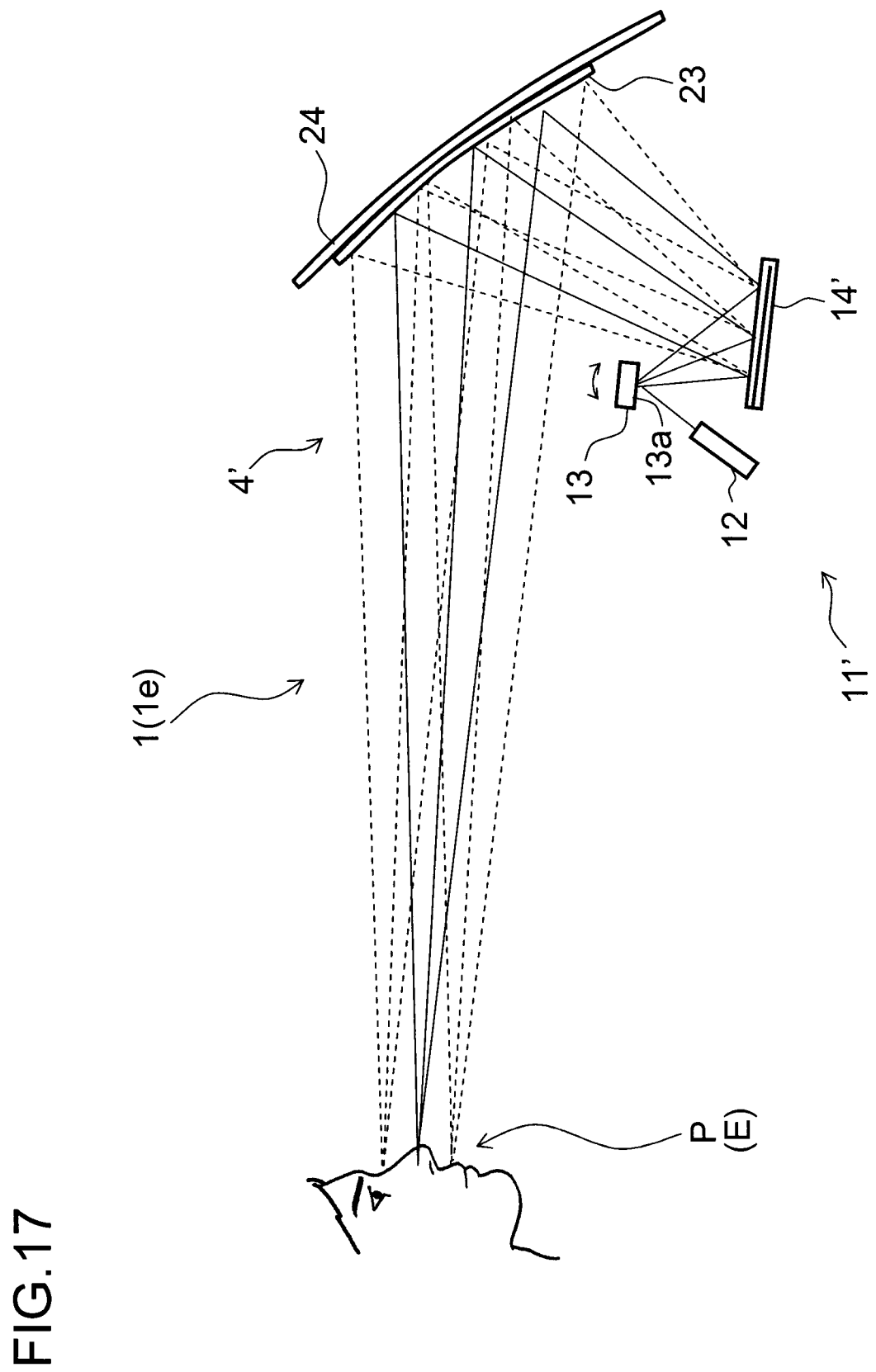
FIG. 17 is a description view showing another structure of the above HUD.

Besides, FIG. 17 is a description view showing another structure of the HUD. This HUD includes the image display device 1 (1e). The image display device 1e is composed by combining the image generation portion 11' of the image display device 1c according to the embodiment 2 and the eyepiece optical system 4' in FIG. 16. However, here, the image generation portion 11' does not include the reflection mirror 15; and has a structure in which the laser light deflected and scanned by the deflection device 13 directly enters the diffusion unit 14', is reflected there, and guided to the eyepiece optical system 4'. Here, the optical pupil E and the reflection surface 13a of the deflection device 13 are in an optically conjugate positional relationship with each other, which is the same as the embodiment 2.

According to the above structures of the image display devices 1d and 1e, the mage light from the image generation portions 11, 11' is diffracted and reflected by the HOE 23 of the eyepiece optical system 4' and guided to the optical pupil E. Accordingly, the observer is able to observe a virtual image of the above image at the position of the optical pupil E. Besides, because the HOE 23 transmits external light to guide it to the optical pupil E, it is possible to observe an external image in a see-through way and the above image at the same time. In other words, by means of the HUD as well, like the HMD, it is possible to observe the image and the external image that are overlapping with each other.

Besides, because the HUD needs to provide a high-brightness image even if the background (external image) is bright, the structure, which uses the laser light source as the light source that emits the high-brightness laser light, is very effective. Moreover, because the HOE 23 is used as the combiner, thanks to the wavelength selection of the HOE 23, only the laser light is diffracted at a high diffraction efficiency and the light having other wavelengths passes through, so that compared with an image display device which uses an LED as the light source, the observer is able to clearly observe both of the background and the image.

Besides, in the image display devices 1d and 1e as well, thanks to the optically conjugate positional relationship between the optical pupil E and the reflection surface 13a of the deflection device 13, the observer is able to observe a bright image at the position of the optical pupil E. Accordingly, from this viewpoint as well, it is possible to say that the image display devices 1d and 1e are very suitable for the HUD which allows the image to be observed under a condition where the background is relatively bright.

Besides, in the case of the HUD, because it is impossible to fix a relative position between the observer's eye and the eyepiece optical system 4' like the HMD, it is very effective to secure a large area of the optical pupil E by means of the diffusion units 14 and 14'.

Besides, in the HUD shown in FIG. 17, by means of the diffusion unit 14' of the reflective type, the disposition of the optical system has the degree of freedom, so that it is possible to dispose the optical system more compactly. Besides, like the embodiment 2, in the case where the diffusion unit 14' is composed of the reflective-type HOE, a high diffraction efficiency is obtained in a wide range of incident angles, so that compared with the case where the diffusion unit is composed of the transmissive type, it is possible to secure a wider area of the optical pupil E.

[Embodiment 4]

Still another embodiment of the present invention is described based on drawings as follows. Here, for convenience of the following description, the same structures as the embodiments 1 to 3 are indicated by the same member numbers and description of them is skipped.

Figure 18:
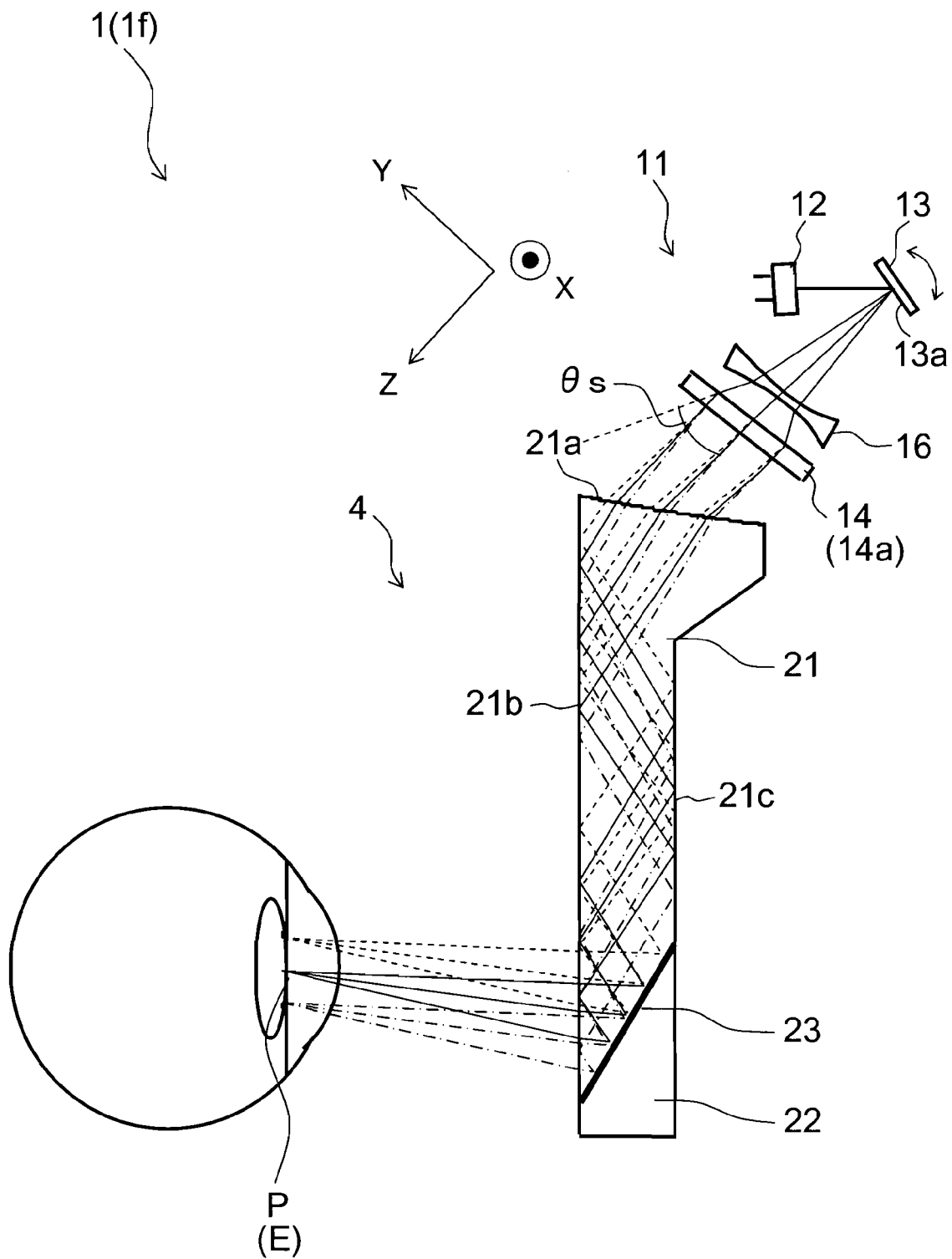
FIG. 18 is a sectional view showing a schematic structure of an image display device according to still another embodiment of the present invention.

FIG. 18 is a sectional view showing a schematic structure of the image display device 1 according to the present embodiment. The image display device 1 according to the present embodiment has a structure in which an optical element 16 is further disposed in the image display device 1a according to the embodiment 1. Here, the image display device 1 in FIG. 18 is, for convenience, called an image display device 1f in some cases. The optical element 16 is composed of a lens having negative power and disposed in the light path between the diffusion unit 14 (e.g., diffusion plate 14a) and the deflection device 13.

In a case where a MEMS mirror is used as the deflection device 13, the optical oscillation angle (scan angle) is generally about 10° to 25°. In a case where the light deflected and scanned by the deflection device 13 is made to enter the diffusion unit 14 at the previous-current optical oscillation angle, if the optical oscillation angle is small, the scan area on the diffusion unit 14 becomes small. To enlarge the scan area, the distance between the deflection device 13 and the diffusion unit 14 needs only to be enlarged, in which, however, the image generation portion 11 becomes large.

In this point, as in the present embodiment, the optical element 16 having the negative power is inserted between the deflection device 13 and the diffusion unit 14, so that even if the optical oscillation angle at the deflection device 13 is small, it is possible to enlarge $\theta s$ by means of the optical element 16. Accordingly, it is possible to shorten the distance between the deflection device 13 and the diffusion unit 14 and to reduce the size of the image generation portion 11.

Next, condition formulas relating to the size reduction of the image generation portion 11 are described. It is desirable that the image display devices according to the above respective embodiments meet the following condition formulas, (3), (4), and (5), that is, $$\theta sx\_max > 10°, \theta sy\_max > 10° \quad (3)$$

$$1.03 < \cos(\theta dx\_max)/\cos(\theta sx\_max) < 1.15 \quad (4)$$

$$1.03 < \cos(\theta dy\_max)/\cos(\theta sy\_max) < 1.15 \quad (5)$$

where $\theta sx\_max$: a maximum value (°) of $\theta sx$;
$\theta sy\_max$: a maximum value (°) of $\theta sy$;
$\theta dx\_max$: a maximum value (°) of $\theta dx$; and
$\theta dy\_max$: a maximum value (°) of $\theta dy$.

If $\theta sx\_max$ and $\theta sy\_max$ are under the lower limit value of the condition formula (3), the optical oscillation angle is small, so that to enlarge the scan area, it is necessary to lengthen the distance between the deflection device 13 and the diffusion unit 14; accordingly, the image generation portion 11 becomes large. On the other hand, if $\cos(\theta dx\_max)/\cos(\theta sx\_max)$ and $\cos(\theta dy\_max)/\cos(\theta sy\_max)$ are under the lower limit values of the formulas (4) and (5), the size-reduction effect is small; while if $\cos(\theta dx\_max)/\cos(\theta sx\_max)$ and $\cos(\theta dy\_max)/\cos(\theta sy\_max)$ are over the upper limit values of the formulas (4) and (5), the deflection angle at the diffusion unit 14 is too large, so that the error sensitivity of each optical element becomes severe.

Accordingly, by meeting the condition formulas (3), (4), and (5), while alleviating the error sensitivity of each optical element, it becomes possible to reduce the size of the image generation portion 11. In other words, even in the case where the MEMS mirror is used as the deflection device 13, it becomes possible to sufficiently reduce the size of the image generation portion 11.

Here, a table 1 represents values of the condition formulas for the respective image display devices 1a to 1f shown in FIG. 1, FIG. 9, FIG. 11, FIG. 16, FIG. 17, and FIG. 18. Here, the sign of $\theta d\_max$ is positive in a case where the laser light diverges after it is output from the diffusion unit 14, while the sign of $\theta d\_max$ is negative in a case where the laser light converges after it is output from the diffusion unit 14. Besides, the table 1 represents the values in the Y direction only, with the same values in the X direction as in the Y direction. From this table 1, it is understood that each of the image display devices 1a to 1f meets all of the condition formulas (3), (4), and (5).

TABLE 1

|  | FIG. 1 (1a) | FIG. 9 (1b) | FIG. 11 (1c) | FIG. 16 (1d) | FIG. 17 (1e) | FIG. 18 (1f) |
|---|---|---|---|---|---|---|
| $\theta dy\_max(°)$ | −2 | −2 | 0 | 5 | 4 | −2 |
| $\theta sy\_max(°)$ | 26 | 20 | 16 | 22 | 17 | 26 |
| $\cos(\theta dy\_max)$ | 0.999 | 0.999 | 1.000 | 0.996 | 0.998 | 0.999 |
| $\cos(\theta sy\_max)$ | 0.899 | 0.940 | 0.961 | 0.927 | 0.956 | 0.899 |
| $\cos(\theta dy\_max)/\cos(\theta sy\_max)$ | 1.112 | 1.064 | 1.040 | 1.074 | 1.043 | 1.112 |

[Embodiment 5]

Still another embodiment of the present invention is described based on drawings as follows. Here, for convenience of the following description, the same structures as the embodiments 1 to 4 are indicated by the same member numbers and description of them is skipped.

(Structures of HUD and Image Display Device)

Figure 19:
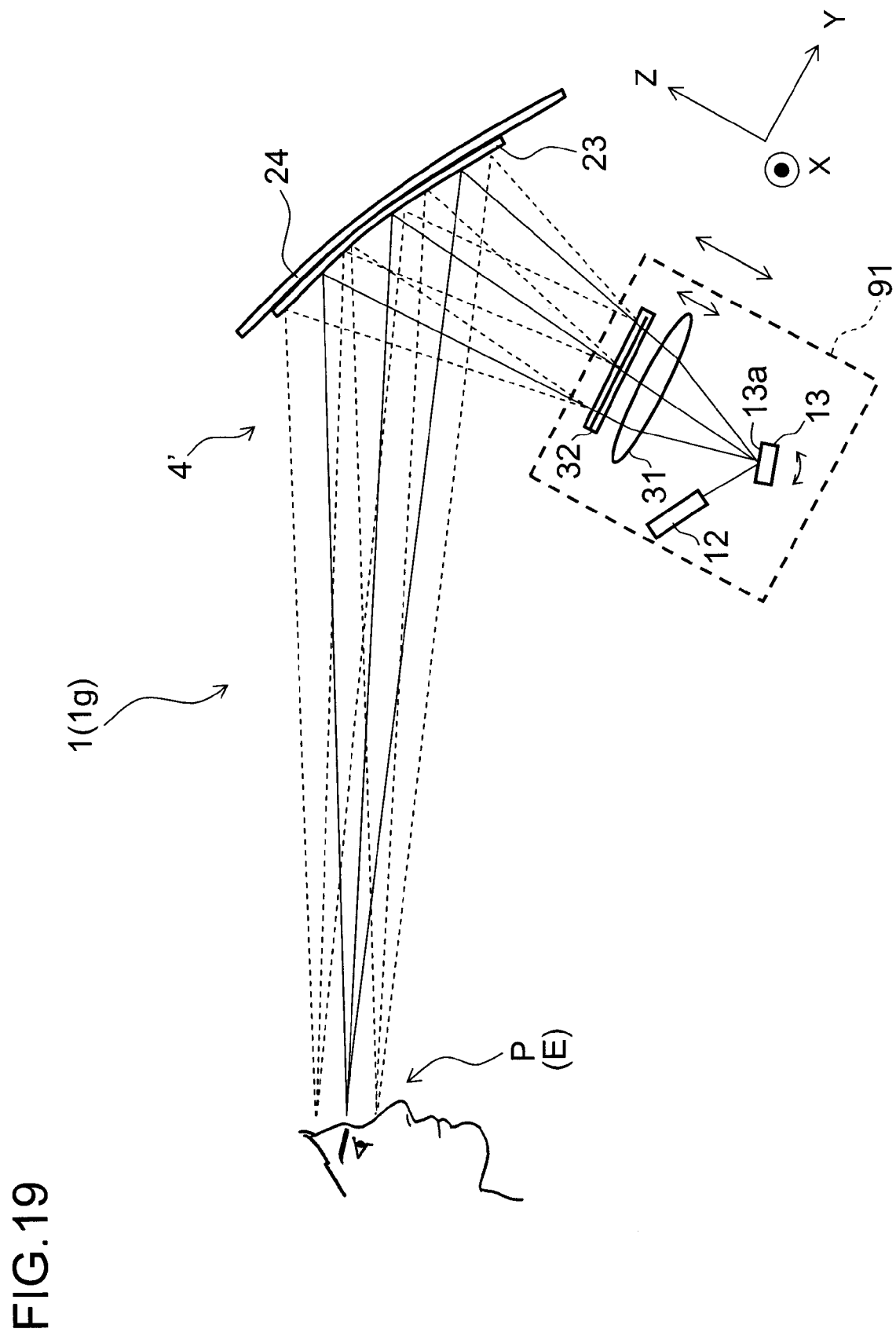
FIG. 19 is a description view showing a schematic structure of an HUD and an image display device according to still another embodiment of the present invention.

FIG. 19 is a description view showing a schematic structure of an HUD according to the present embodiment. This HUD includes the image display device 1 (1g). This image display device 1g has: an image generation portion 91; and the eyepiece optical system 4' in the embodiment 3; and guides the image light from the image generation portion 91 to the optical pupil E that is formed by the eyepiece optical system 4', thereby allowing the observer to observe a virtual image of the image at the position of the optical pupil E. Hereinafter, specific description is performed.

The image generation portion 91 generates an image the observer observes; and is so structured as to include: the laser light source 12 and the deflection device 13 like in the embodiment 1; a correction lens 31; and a diffusion plate 32.

Here, the reflection surface 13a (especially, a point from which the light reflected by the reflection surface 13a is output) of the deflection device 13 is in an optically conjugate positional relationship with the optical pupil E (e.g., see a light path indicated by a solid line in FIG. 19). Here, the above conjugate relationship is kept even if diopter adjustment described later is performed, which is described later.

The correction lens 31 is an optical element that has positive power; to optically keep the positional relationship between the optical pupil E and the reflection surface 13a of the deflection device 13 in conjugate, the correction lens 31 is disposed in the light path of the image light, especially, in the light path between the deflection device 13 and the diffusion plate 32. The diffusion plate 32 is a diffusion means that is disposed on the image surface of the eyepiece optical system 4' and diffuses the laser light deflected by the deflection device 13.

The eyepiece optical system 4' is an optical system that guides the image light from the image generation portion 91 to the optical pupil E and guides the light (external light) of an external image to the optical pupil E; and is composed by fixing the HOE 23 to the windshield 24. The HOE 23 is the volume-phase type and reflective type of holographic optical element as the combiner which diffracts and reflects the image light from the image generation portion 91 to guide it to the optical pupil E; and at the same time, transmits the external light to guide it to the optical pupil E. the HOE 23 of the reflective type is fabricated by: attaching a hologram photosensitive material to a base plate (windshield 24); thereafter, directing two lines of light flux to the hologram photosensitive material from the base-plate side and the opposite side; and recording the interference fringes produced by the interference of these two lines of light flux as refractive-index modulation into the hologram photosensitive material.

In the above structure, the laser light (which is collimated) emitted from the laser light source 12 of the image generation portion 91 is deflected and scanned two dimensionally by the reflection surface 13a of the deflection device 13; and enters the diffusion plate 32 via the correction lens 31. At this time, by means of a control portion 35 (see FIG. 20) described later, while modulating the intensity of the laser light in accordance with image data, by deflecting and scanning the laser light by means of the deflection device 13 in synchronization with the intensity modulation, it is possible to project an image (primary image) onto the diffusion plate 32 that is disposed on the image surface of the eyepiece optical system 4'.

The light of the projected image is diffused by the diffusion plate 32 into divergent that has a predetermined diffusion angle; thereafter, reaches the HOE 23 of the eyepiece optical system 4'. The HOE 23 is so fabricated as to reflect only the light having the wavelength of the laser light from the laser light source 12 and the light having wavelengths very close to the wavelength of the laser light, so that the light having wavelengths other than the above wavelengths passes through the HOE 23. Accordingly, the image light that reaches the HOE 23 is diffracted and reflected by the HOE 23; thereafter, reaches the optical pupil E.

When the observer's pupil P is situated at the position of the optical pupil E, each of the rays deflected by the deflection device 13 is guided to the observer's retina. In other words, the principal ray of each image height passes through the center of the optical pupil E of the eyepiece optical system 4'; and without being blocked by the stop (iris) of the observer's eye, reaches the retina of the observer's eye. Accordingly, the observer is able to observe in front an enlarged virtual image of the two-dimensional image that is generated by the image generation portion 91. At the same time, the light that is contained in the external light and has a wavelength different from that of the laser light passes through the HOE 23, so that the observer is able to naturally observe not only the above image but also the external image.

As described above, by means of: the laser light source 12 as the light source that emits the high-brightness laser light; and the highly wave-selective HOE 23, as the combiner, that is of the volume phase type and of the reflective type, the image display device 1g according to the present embodiment allows the observer to observe a high-contrast image that has a good see-through characteristic. Because the HUD needs to provide a high-brightness image if the background (external image) is bright, the structure, which uses the laser light source 12 as the light source that emits the high-brightness laser light, is very effective for the HUD. Moreover, because the HOE 23 is used as the combiner, thanks to the wavelength selection of the HOE 23, only the laser light is diffracted at a high diffraction efficiency and the light having other wavelengths passes through, so that compared with an image display device which uses an LED as the light source, the observer is able to clearly observe both of the background and the image.

Besides, in the image generation portion 91, because the light after the deflection by the deflection device 13 is diffused by the diffusion plate 32, it is possible to spread the optical pupil E in both directions of the X direction and the Y direction. In other words, the light diffused by the diffusion plate 32 constitutes a predetermined-size and observable pupil area around the pass-through point (point on which the light seems to collect) for each principal ray on the plane of the optical pupil E. As described above, because the optical pupil E having the predetermined area is obtained (because the observable point is not one), even if the position of the observer's pupil P moves around in the plane of the optical pupil E up, down, left and right, it becomes possible for the observer to observe a good image. Especially, in the case of the HUD, because it is impossible to fix a relative position between the observer's eye and the eyepiece optical system 4' like the HMD, it is very effective to secure a large area of the optical pupil E by means of the diffusion plate 32.

Besides, in the present embodiment, the correction lens 31 is disposed in the light path between the deflection device 13 and the diffusion plate 32. The correction lens 31 may be disposed at any point in the light path from the deflection device 13 to the optical pupil E; especially, it is preferable that from a viewpoint of size reduction of the image display device, the correction lens 31 is disposed in the light path between the deflection device 13 and the diffusion plate 32. If the correction lens 31 is disposed, for example, at a point closer to the eyepiece optical system 4' than to the diffusion plate 32, to make all of the light diffused by the diffusion plate 32 enter the correction lens 31, it becomes necessary to enlarge the correction lens 31.

Besides, by disposing the correction lens 31 between the deflection device 13 and the diffusion plate 32, the correction lens 31 is not disposed in the eyepiece optical system 4' but in the image generation portion 91 away from the combiner (HOE 23), so that it is possible to secure a wide observation region for an external image that is observed in a see-through way via the eyepiece optical system 4'.

Besides, in the present embodiment as well, the angle characteristic of the diffraction efficiency of the HOE 23 is the same as FIG. 8; and in light of such angle characteristic, the diffusion power (diffusion angle) of the diffusion plate 32 is set. In other words, the diffusion plate 32 diffuses the laser light deflected by the deflection device 13 in such a way that the 50% or more diffraction efficiency is obtained at the HOE 23. As a result of this, it is possible to obtain effects which are the same effects as the embodiment 1: it is possible to allow the observer to observe a bright image; and it is possible to prevent the not-diffracted light (0-order light) from becoming ghost light and prevent the image quality from deteriorating because of ghost light.

(Diopter Adjustment of Virtual Image)

Figure 20:
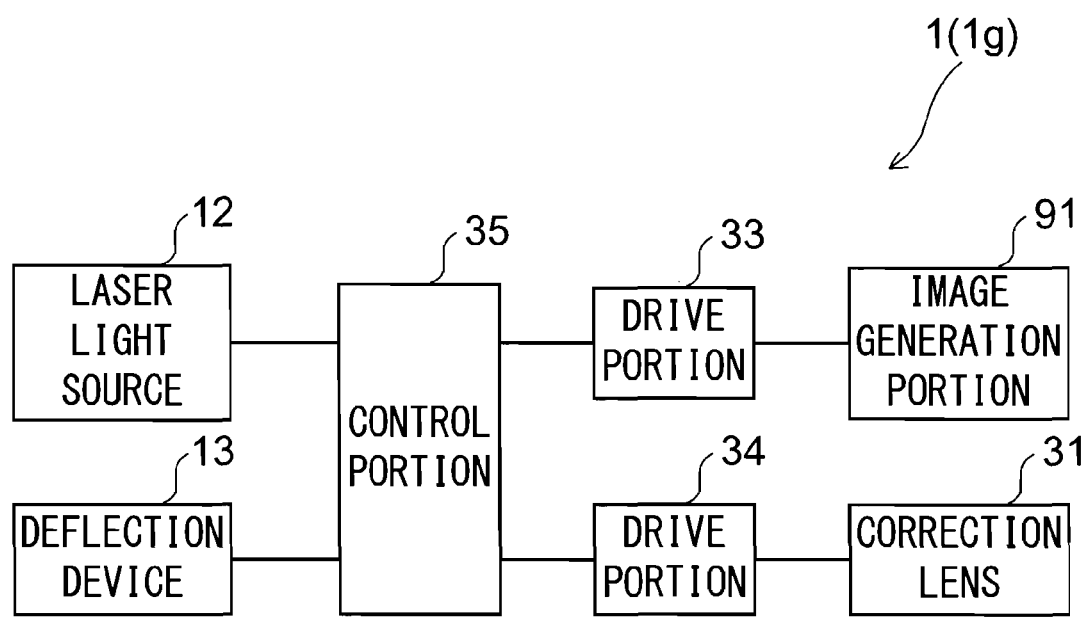
FIG. 20 is a block diagram showing a schematic structure of a main portion of the above image display device.

Next, diopter adjustment of a virtual image is described. FIG. 20 is a block diagram showing a schematic structure of a main portion of the image display device 1g. The above image display device 1g further has: drive portions 33, 34; and a control portion 35.

The drive portion 33 is a drive mechanism that moves the image generation portion 91 along the optical axis; and is so structured as to have: a motor; a gear; a shaft and the like. By moving the image generation portion 91 along the optical axis by means of the drive portion 33, it is possible to adjust the diopter of a virtual image the observer observes, that is, the distance between the optical pupil E and the virtual image. For example, in a case where a word "caution" is displayed as a virtual image and the observer observes this, it is possible to gradually move the word "caution" close to the observer by means of the above diopter adjustment. In this case, it is possible to increase the visibility of the virtual image and to increase the effect of prompting the observer to take caution. Especially, there are many case where the HUD is used under a dynamic environment (e.g., in a time of driving a vehicle); under such an environment, because usually the viewpoint is put on the external image, the time of watching the virtual image is short. Accordingly, the diopter adjustment of a virtual image is especially effective in the HUD to increase the visibility of such a virtual image.

The drive portion 34 is a drive mechanism that moves the correction lens 31 along the optical axis; and like the drive portion 33, is so structured as to have: a motor; a gear; a shaft and the like.

The control portion 35 controls operation of each portion of the image display device 1. For example, the control portion 35 controls: intensity modulation at the laser light source 12 based on image data; rotation (deflection and scanning by the laser light) of the reflection surface 13a at the deflection device 13; driving of the drive portions 33, 34 and the like. In the present embodiment, the drive portion 33 and the control portion 35 constitute a virtual-image diopter adjustment means that adjusts the diopter of a virtual image by moving the image generation portion 91 along the optical axis. Besides, the drive portion 34 and the control portion 35 constitute a correction-lens movement means that moves the correction lens 31 along the optical axis.

Figure 21:
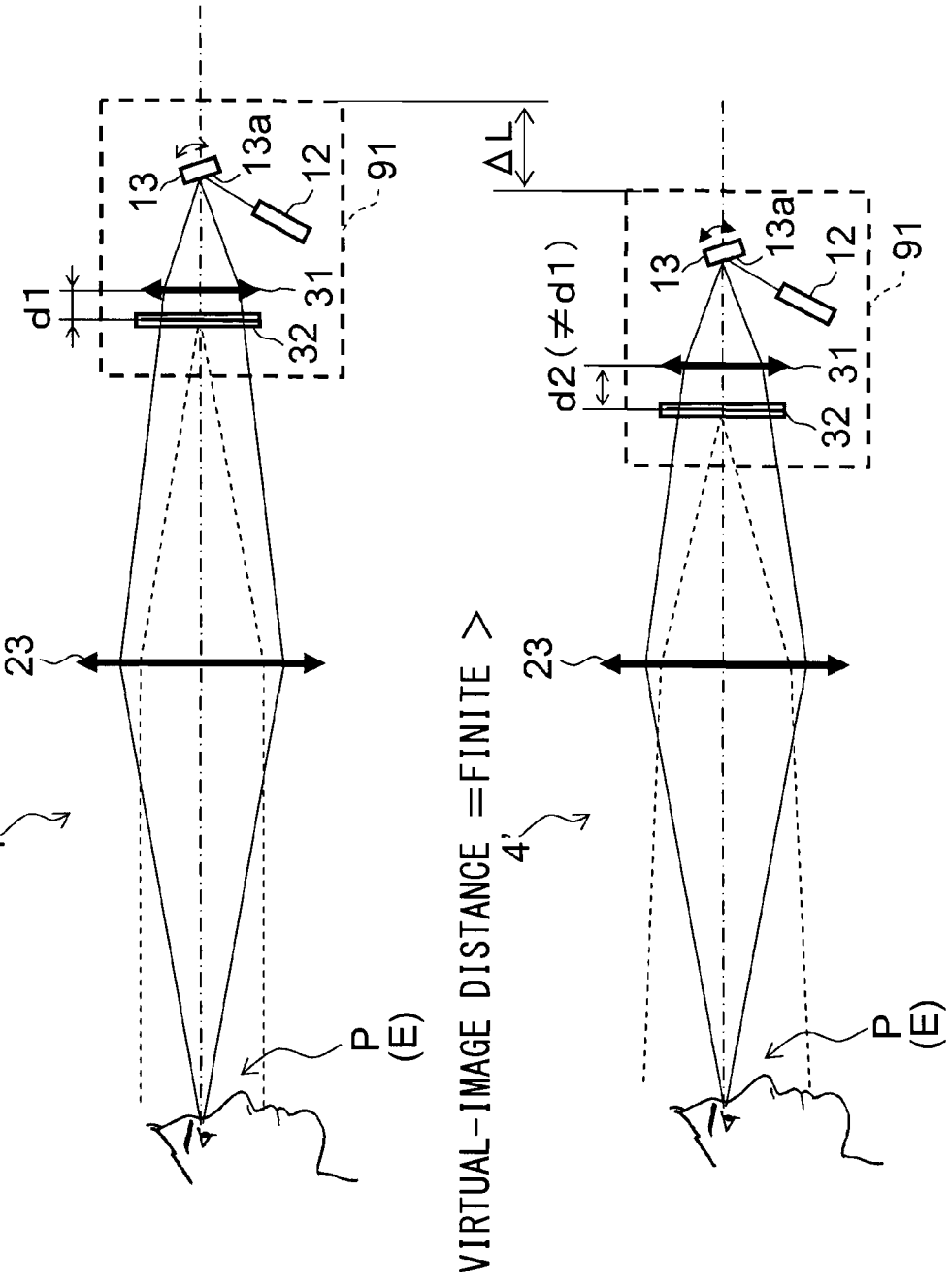
FIG. 21 is a description view schematically showing light paths of image light when a virtual-image distance is infinite and when the virtual-image distance is finite in the above image display device.

FIG. 21 schematically shows light paths of the image light when a virtual-image distance is infinite and when the virtual-image distance is finite. As shown in the figure, the correction-lens movement means, as the image generation portion 11 is moved by the virtual-image diopter adjustment means, moves the correction lens 31 along the optical axis (e.g., see a light path indicated by a solid line) while keeping the optical pupil E and the reflection surface 13a of the deflection device 13 in the optically conjugate positional relationship. Hereinafter, more specific value examples of the diopter adjustment are represented.

In FIG. 21, when the virtual-image distance is infinite, a position of the image generation portion 91 in the optical-axis direction is used as a reference; and the movement distance of the image generation portion 91 in the optical-axis direction due to the diopter adjustment is defined as ΔL (mm). Besides, when the virtual-image distance is infinite, the distance in the optical-axis direction between the correction lens 31 and the diffusion plate 32 is defined as d1 (mm); and the distance after the diopter adjustment and in the optical-axis direction between the correction lens 31 and the diffusion plate 32 is defined as d2 (mm). In this case, when the movement distance of the correction lens 31 due to the diopter adjustment and in the optical-axis direction is defined as Δd (mm), Δd is calculated Δd=d2−d1. However, in the present embodiment, d2≠d1.

A table 2 represents a specific relationship among; the virtual-image distance (display distance (m)) of the virtual image from the optical pupil E); the movement distance ΔL of the image generation portion 91; and the movement distance Δd of the correction lens 31. Incidentally, here, the focal length of the HOE 23 is 200 (mm); the focal length of the correction lens 31 is 20 (mm); and the distance between the optical pupil E and the HOE 23 is 1 (m).

TABLE 2

| virtual-image distance (m) | ΔL | Δd (= d2 − d1) |
|---|---|---|
| infinite | — | — |
| 5.0 | 8.27 | 0.14 |
| 4.0 | 10.68 | 0.18 |
| 3.0 | 14.94 | 0.23 |
| 2.0 | 23.91 | 0.27 |

HOE-combiner focal length: 200 [mm]
correction-lens focal length: 20 [mm]
pupil-HOE combiner distance: 1 [m]

As described above, as the image generation portion 91 is moved because of the diopter adjustment, in accordance with the movement amount, the correction lens 31 is moved along the optical axis, so that at whichever position the virtual image is situated, it is possible to keep the optical pupil E and the reflection surface 13a of the deflection device 13 in the optically conjugate positional relationship (see a light path indicated by a solid line in FIG. 21). Accordingly, irrespective of the virtual-image diopter, it is possible to avoid quality deterioration of the observed image.

In other words, thanks to the above conjugate relationship, it is possible to increase the use efficiency of the light supplied from the image generation portion 91, so that irrespective of the virtual-image diopter, the observer is able to observe a bright image at the position of the optical pupil E. Especially, because the HOE 23 of the volume phase type and of the reflective type diffracts and reflects only the light that enters in the predetermined angle range, it is hard to obtain a bright image, so that increasing the light use efficiency by meeting the above conjugate relationship becomes very effective in the structure that uses the HOE 23 as the combiner.

Moreover, thanks to the above conjugate relationship, each ray, which is diffracted by the HOE 23 and output from each image height, passes through a point (same point) in the plane of the optical pupil E irrespective of the virtual-image diopter. Accordingly, even if the observer's pupil P moves around in the plane of the optical pupil E, irrespective of the virtual-image diopter, it is possible to make the image light from all of the screen regions enter the observer's pupil P, so that the observer is able to clearly (with no missing portions and no brightness unevenness) observe the entire image.

Besides, even if the diopter adjustment is performed, the conjugate relationship between the optical pupil E and the reflection surface 13a of the deflection device 13 is kept and the observer is able to observe the bright image at the position of the optical pupil E, so that the image display device 1 according to the present embodiment becomes suitable for the HUD that is often used to observe an image under a condition in which an external image is relatively bright and uses the HOE 23 as the combiner.

Here, the table 2 represents a relationship between ΔL and Δd when the virtual-image distance is a specific distance; however, even for other distances, relationships between ΔL and Δd that achieve the above conjugate relationship are predetermined. As described above, the relationship between ΔL and Δd that achieve the above conjugate relationship is stored in a not-shown storage portion as a table in advance; when the control portion 35 reads Δd corresponding to ΔL from the storage portion, the drive portion 34 moves the correction lens 31 in the optical-axis direction by Δd.

In the mean time, the above control portion 35 may function as a field-angle adjustment means that independent of the diopter adjustment, changes the field angle of the observed image, that is, the size of the observed image (virtual image). It is possible to perform the field-angle adjustment of the observed image by, for example, controlling the timing of the intensity modulation of the laser light at the laser light source 12; or by controlling the scan angle (deflection angle) at the deflection device 13. For example, in scanning one line, by turning on/off the emission of the laser light corresponding to the number of dots at both end portions, it is possible to change the size of the image in the above scan line direction. Besides, for example, by changing the maximum rotation angle of the reflection surface 13a of the deflection device 13, it is possible to change the maximum scan angle of the laser light that is reflected by the reflection surface 13a, which also makes it possible to change the size of the image.

As described above, by means of any of the above control by the control portion 35, it is possible to, independent of the diopter adjustment, change the field angle of the observed image. Accordingly, even in a case where the change in the virtual-image size by the diopter adjustment is not enough, it is possible to perform a further change by means of the field-angle adjustment means. Accordingly, compared with a case where only the diopter adjustment is performed, it is possible to change the size of the virtual image at a high speed and to further increase the visibility of the virtual image.

Here, in the present embodiment, the laser light source 12 is used as the light source; however, to reduce so-called laser speckle that is caused by the interference of the laser light, it is desirable to vibrate the diffusion plate 32 in the surface at an amplitude of a few micrometers or smaller and at a high speed (e.g., 50 Herz or higher).

[Embodiment 6]

Still another embodiment of the present invention is described based on drawings as follows. Here, for convenience of the following description, the same structures as the embodiments 1 to 5 are indicated by the same member numbers and description of them is skipped.

(Structure of Image Display Device)

Figure 22:
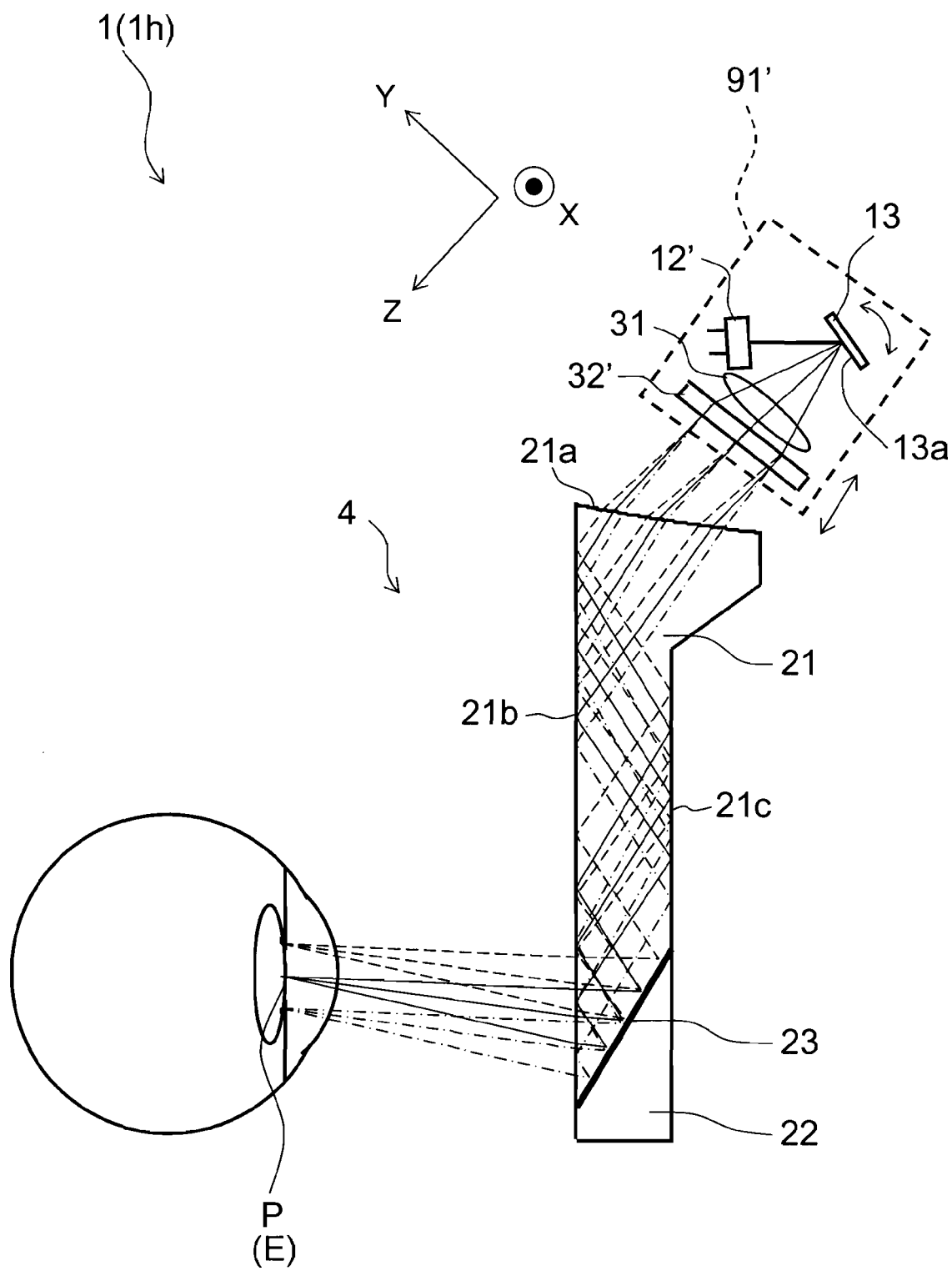
FIG. 22 is a sectional showing a schematic structure of an image display device according to still another embodiment of the present invention.

FIG. 22 is a sectional showing a schematic structure of the image display device 1 (1h) according to the present embodiment. The image display device 1h is applicable to the HMD in FIG. 2; and is so structured as to have: an image generation portion 91'; and the eyepiece optical system 4. The image display device 1h guides the image light from the image generation portion 91' to the optical pupil E via the eyepiece optical system 4, thereby allowing the observer to observe a virtual image of the image at the position of the optical pupil E. Hereinafter, specific description is performed.

The image generation portion 91' generates an image the observer observes; and is so structured as to include: a laser light source 12' and the deflection device 13 that are the same as the embodiment 2; the correction lens 31; and a diffusion plate 32'.

The correction lens 31 makes the respective scan rays reflected by the reflection surface 13a of the deflection device 13 parallel to each other. Thanks to the correction lens 31 and the eyepiece optical system 4, the reflection surface 13a of the deflection device 13 and the optical pupil E of the eyepiece optical system 4 are in an optically conjugate positional relationship.

Figure 23:
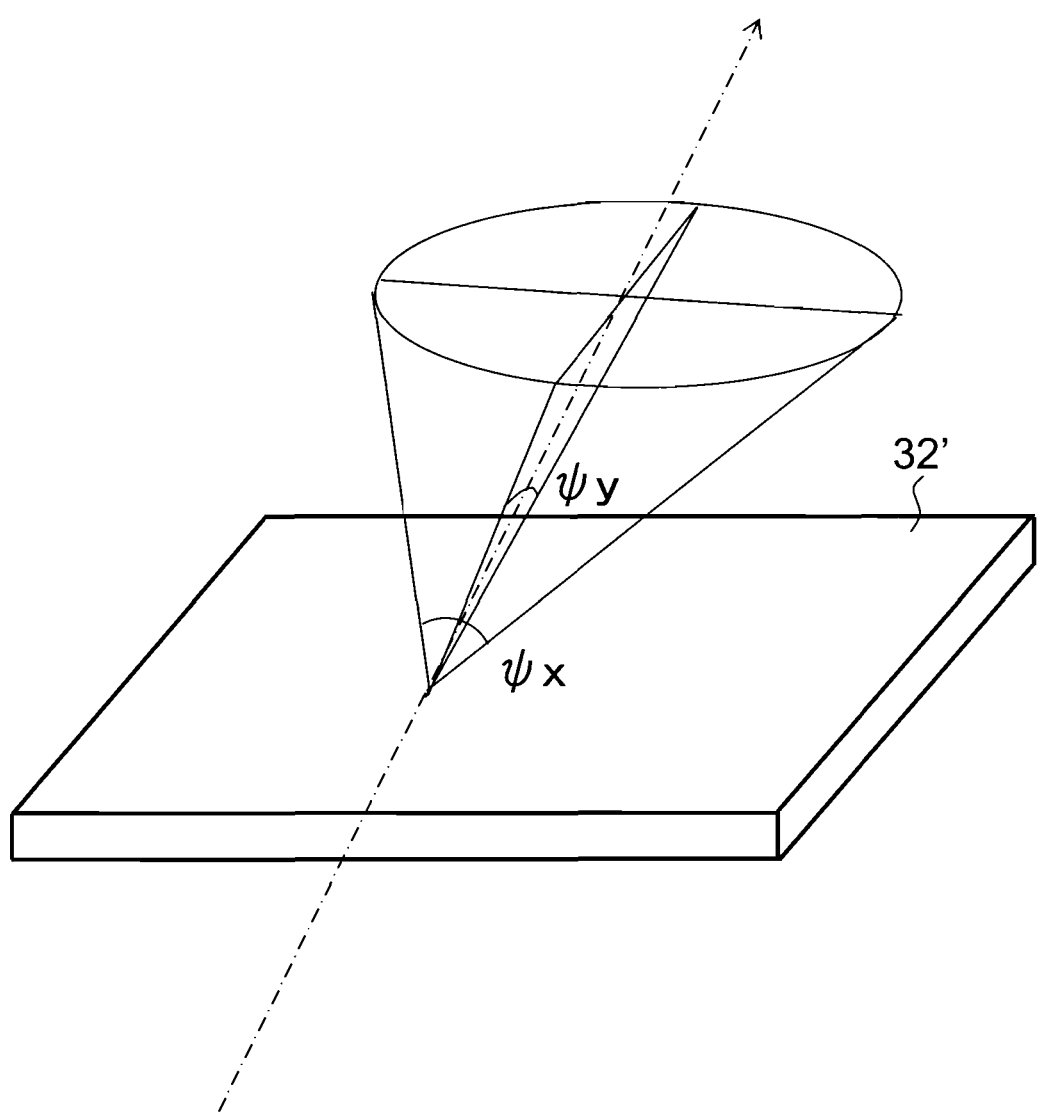
FIG. 23 is a perspective view schematically showing light diffused by a diffusion plate of the above image display device.

The diffusion plate 32' is disposed on the image surface of the eyepiece optical system 4 and diffuses the laser light deflected by the deflection device 13. In the present embodiment, the diffusion plate 32' diffuses the laser light, which is output from the respective scan positions, at different diffusion angles in the X direction and the Y direction. In other words, the diffusion angle (diffusion characteristic) of the diffusion plate 32' has anisotropy. FIG. 23 is a perspective view schematically showing the light diffused by the diffusion plate 32'. When the diffusion angle in the X direction is $\phi x(°)$; and the diffusion angle in the Y direction is $\phi y(°)$, $\phi x > \phi y$ is satisfied in the present embodiment.

The eyepiece optical system 4 is an optical system that guides the image light from the image generation portion 91' and guides the light (external light) of the external image to the optical pupil E; and in the present embodiment, is a telecentric optical system. The eyepiece optical system 4 is so structured as to have: the eyepiece prism 21; the deflection prism 22; and the HOE 23, which is the same as the embodiment 1.

In the above structure, each of the R, G, and B laser light (which is collimated) successively emitted from the laser light source 12' of the image generation portion 91' is deflected and scanned two dimensionally by the reflection surface 13a of the deflection device 13; and enters the diffusion plate 32' via the correction lens 31. At this time, by means of the control portion 35 (see FIG. 24), while modulating the intensity of the laser light in accordance with image data, by deflecting and scanning the laser light by means of the deflection device 13 in synchronization with the intensity modulation, it is possible to project an image (primary image) onto the diffusion plate 32' that is disposed on the image surface of the eyepiece optical system 4.

The light of the projected image is diffused by the diffusion plate 32' into divergent light that has a predetermined diffusion angle; thereafter, enters the inside of the eyepiece prism 21 of the eyepiece optical system 4 via the surface 21a. The image light entering the eyepiece prism 21 is totally reflected by the surface 21b of the eyepiece prism 21 close to the observer; thereafter, is totally reflected again by the surface 21c opposite to the surface 21b, totally reflected again by the surface 21b and reaches the HOE 23. The HOE 23 is so fabricated as to reflect only the light having the wavelengths of the R, G, and B laser light from the laser light source 12' and the light having wavelengths very close to the wavelengths of the laser light, so that the light having wavelengths other than the above wavelengths passes through the HOE 23. Accordingly, the image light that reaches the HOE 23 is diffracted and reflected by the HOE 23; thereafter, passes through the surface 21b of the eyepiece prism 21 to reach the optical pupil E.

When the observer's pupil P is situated at the position of the optical pupil E, each of the rays deflected by the deflection device 13 is guided to the observer's retina, so that the observer is able to observe in front an enlarged virtual image of the two-dimensional image that is generated by the image generation portion 91'. At the same time, the light that is contained in the external light and has a wavelength different from that of the laser light passes through the HOE 23, so that the observer is able to naturally observe not only the above image but also the external image.

In the present embodiment, because the light after the deflection by the deflection device 13 is diffused by the diffusion plate 32', the optical pupil E spreads in both directions of the X direction and the Y direction; however, the diffusion plate 32' diffuses the laser light output from the respective scan positions at different diffusion angles in the X direction (horizontal direction) and the Y direction (vertical direction), so that it is possible to make the size of the optical pupil E different in the X direction and in the Y direction; and it is possible to obtain the optical pupil E that is long laterally or the optical pupil E that is long longitudinally. In the present embodiment, the diffusion angle of the laser light at the diffusion plate 32' is larger in the X direction than in the Y direction ($\phi x > \phi y$), so that the laterally long optical pupil E is obtained. In this case, because the light (laser light) is collected in the vertical direction, it is possible to allow the observer to observe a bright image; while because the optical pupil E is wide in the horizontal direction, it is possible to easily satisfy a plurality of observers who have different distances between the eyes.

On the other hand, if the diffusion angle of the diffusion plate 32' is set $\phi x < \phi y$, it is possible to obtain the optical pupil E that is long longitudinally. This structure is effective in the HUD according to the embodiment 5, for example. Observers have different sitting heights, so that if the optical pupil E is long longitudinally, it is possible for the HUD to easily satisfy a plurality of observers who have different sitting heights.

(Diopter Adjustment of Virtual Image)

Figure 24:
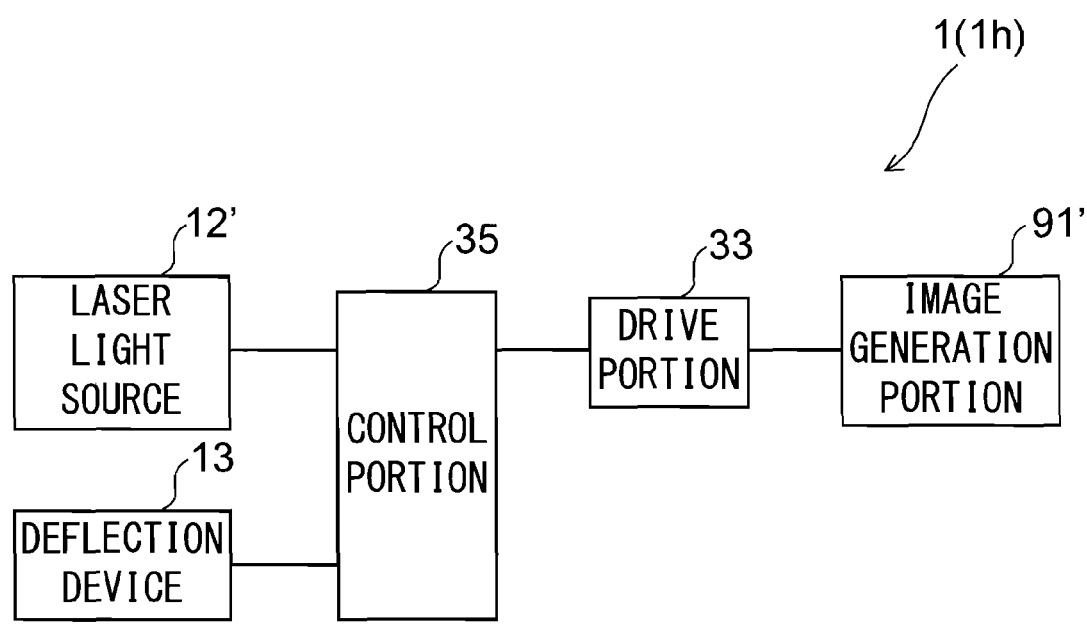
FIG. 24 is a block diagram showing a schematic structure of a main portion of the above image display device.

In the mean time, FIG. 24 is a block diagram showing a schematic structure of a main portion of the image display device 1h according to the present embodiment. As shown in the figure, the image display device 1h has the drive portion 33 and the control portion 35, which is in common with the image display device 1g according to the embodiment 5. However, the image display device 1h does not include the drive portion 34 that is the drive mechanism for the correction lens 31. In the present embodiment, the drive portion 33 constitutes the drive mechanism that moves the image generation portion 91' along the optical axis. Besides, the control portion 35 controls operation of each portion of the image display device 1 such as intensity modulation at the laser light source 12' based on the image data and the like. In the present embodiment, the drive portion 33 and the control portion 35 constitute the virtual-image diopter adjustment means that adjusts the diopter of a virtual image by moving the image generation portion 91' along the optical axis. Hereinafter, more specific numerical value examples of the diopter adjustment are represented.

Figure 25:
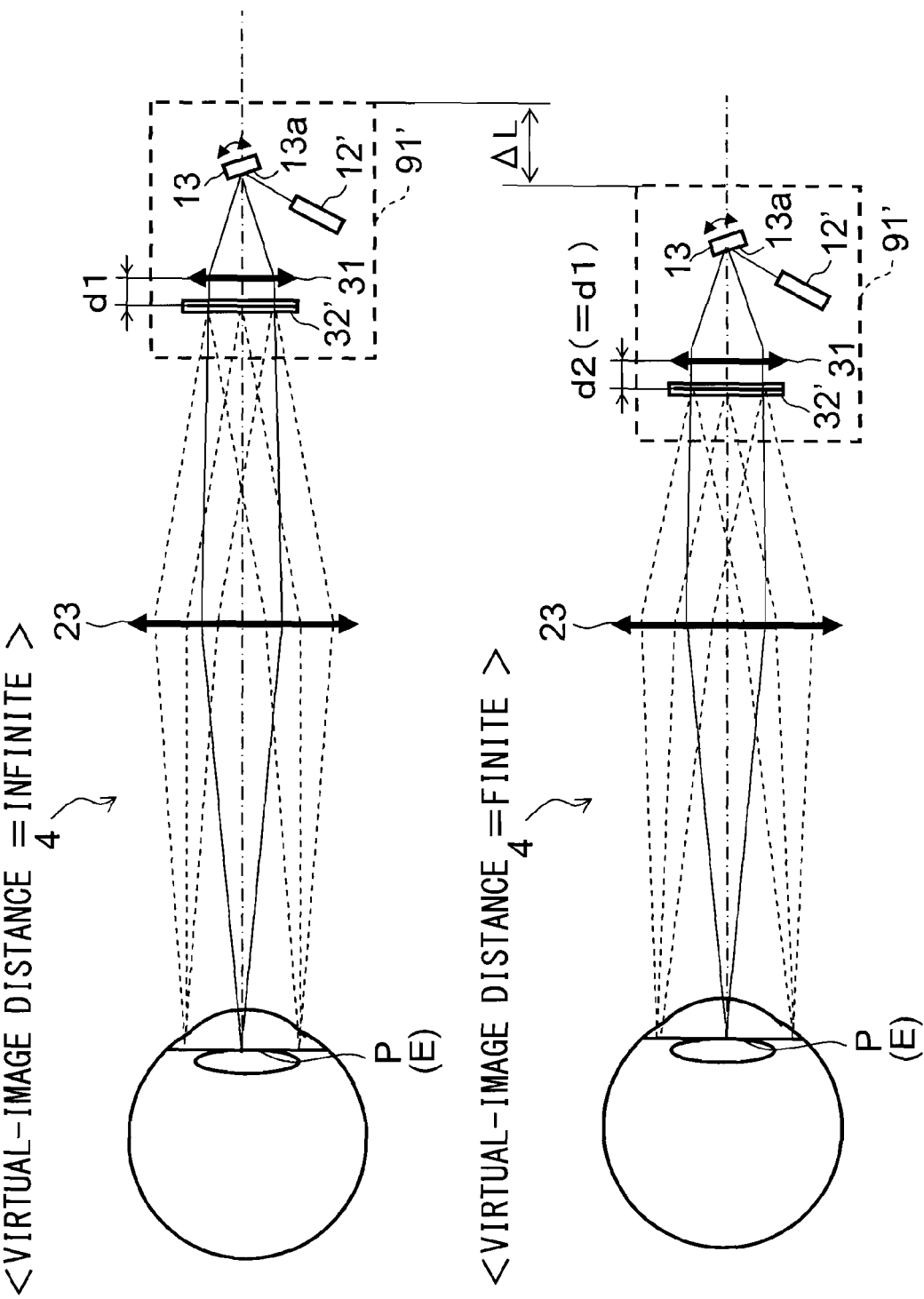
FIG. 25 is a description view schematically showing light paths of image light when a virtual-image distance is infinite and when the virtual-image distance is finite in the above image display device.

FIG. 25 schematically shows light paths of the image light when a virtual-image distance is infinite and when the virtual-image distance is finite. In the present embodiment, even if the image generation portion 91' is moved along the optical axis to adjust the diopter of a virtual image by means of the virtual-image diopter adjustment means, because the eyepiece optical system 4 is a telecentric optical system, the optical conjugate relationship between the optical pupil E and the reflection surface 13a of the deflection device 13 is kept (e.g., see a light path indicated by a solid line) even if the correction lens 31 is not moved along the optical axis.

In FIG. 25, when the virtual-image distance is infinite, a position of the image generation portion 91' in the optical-axis direction is used as a reference; and the movement distance of the image generation portion 91' in the optical-axis direction due to the diopter adjustment is defined as $\Delta L$ (mm). Besides, when the virtual-image distance is infinite, the distance in the optical-axis direction between the correction lens 31 and the diffusion plate 32' is defined as d1 (mm); and the distance after the diopter adjustment and in the optical-axis direction between the correction lens 31 and the diffusion plate 32' is defined as d2 (mm). In the present embodiment, when the movement distance of the correction lens 31 due to the diopter adjustment and in the optical-axis direction is defined as $\Delta d$ (mm), $\Delta d = d2 - d1 = 0$.

A table 3 represents a specific relationship among; the virtual-image distance (display distance (m) of the virtual image from the optical pupil E); the movement distance $\Delta L$ of the image generation portion 91'; and the movement distance $\Delta d$ of the correction lens 31. Incidentally, here, the focal length of the HOE 23 is 20 (mm); the focal length of the correction lens 31 is 10 (mm); and the distance between the optical pupil E and the HOE 23 is 20 (m).

TABLE 3

| virtual-image distance (m) | $\Delta L$ | $\Delta d$ (= d2 − d1) |
|---|---|---|
| infinite | — | — |
| 2 | 0.194 | 0.00 |
| 1 | 0.389 | 0.00 |
| 0.5 | 0.778 | 0.00 |
| 0.25 | 1.56 | 0.00 |

HOE-combiner focal length: 20 [mm]
correction-lens focal length: 10 [mm]
pupil-HOE combiner distance: 20 [m]

As described above, in the present embodiment, because the eyepiece optical system 4 is a telecentric optical system, it is possible to keep the optical conjugate relationship between the optical pupil E and the reflection surface 13a of the deflection device 13 even if the correction lens 31 is not moved along the optical axis in the time of the diopter adjustment. Accordingly, irrespective of the virtual-image diopter, the observer is able to observe a bright image at the position of the optical pupil E. Moreover, thanks to the above conjugate relationship, the principal rays that are diffracted by the HOE 23 and output from the respective image heights well enter the optical pupil E, so that even if the observer's pupil P moves around in the plane of the optical pupil E, the observer is able to clearly (with no missing portions and no brightness unevenness) observe the entire image.

Here, of course, it is also possible to compose the image display device, the HMD or the HUD by suitably combining the above structures in the respective embodiments.

Industrial Applicability

The image display device according to the present invention is applicable to an HMD and an HUD.

| List of Reference Symbols | |
|---|---|
| 1 | image display device |
| 1a | image display device |
| 1b | image display device |
| 1c | image display device |
| 1d | dimage display device |
| 1e | image display device |
| 1f | image display device |
| 1g | image display device |
| 1h | image display device |
| 2 | support member (support means) |
| 4 | eyepiece optical system |
| 4' | eyepiece optical system |
| 11 | image generation portion |
| 11' | image generation portion |

| | List of Reference Symbols |
|---|---|
| 12 | laser light source |
| 12' | laser light source |
| 13 | deflection device (deflection means) |
| 13a | reflection surface |
| 14 | diffusion unit (diffusion means) |
| 14' | diffusion unit (diffusion means) |
| 14a | diffusion plate |
| 14b | diffusion plate |
| 14c | field lens |
| 14d | Fresnel lens |
| 14e | diffusion surface |
| 14f | diffusion plate |
| 16 | optical element |
| 23 | HOE |
| 24 | windshield |
| 31 | correction lens |
| 32 | diffusion plate |
| 32' | diffusion plate |
| 33 | drive portion (virtual-image diopter adjustment means) |
| 34 | drive portion (correction-lens movement means) |
| 35 | control portion (virtual-image diopter adjustment means, correction-lens movement means, filed-angle adjustment means) |
| 91 | image generation portion |
| 91' | image generation portion |
| E | optical pupil |

The invention claimed is:

1. An image display device that guides image light from an image generation portion to an optical pupil of an eyepiece optical system, thereby allowing an observer to observe a virtual image of an image at a position of the optical pupil, the image generation portion including:
   a laser light source;
   a deflector that deflects and scans laser light emitted from the laser light source by a reflection surface in two scan directions which are perpendicular to each other; and
   a diffusion plate that is disposed on an image surface of the eyepiece optical system and diffuses the laser light deflected by the deflector;
   wherein the eyepiece optical system includes a holographic optical element of a volume-phase type and of a reflective type as a combiner which diffracts and reflects the image light from the image generation portion to guide the image light to the optical pupil and in parallel with which, transmits and guides external light to the optical pupil; and
   wherein when an axis that optically connects a scan center of the reflection surface of the deflector and a center of the optical pupil to each other is an optical axis, the image display device comprises:
   a virtual-image diopter adjustment section that moves the image generation portion along the optical axis to adjust a diopter of the virtual image;
   a correction lens that is disposed in a light path of the image light; and
   a correction lens movement section that moves the correction lens along the optical axis;
   wherein as the image generation portion is moved by the virtual-image diopter adjustment section, the correction lens movement section moves the correction lens while keeping the optical pupil and the reflection surface of the deflector in an optically conjugate positional relationship.

2. The image display device according to claim 1, wherein the correction lens is disposed between the deflector and the diffusion plate.

3. The image display device according to claim 1, wherein the diffusion plate diffuses the laser light deflected by the deflector in such a way that when the diffused laser light enters the holographic optical element, a 50% or more diffraction efficiency is obtained at the holographic optical element.

4. The image display device according to claim 1, wherein when of the two scan directions, a scan direction corresponding to a horizontal direction of an image that is observed at the position of the optical pupil is a first scan direction, and a scan direction corresponding to a vertical direction of the image is a second scan direction, the diffusion plate diffuses the laser light at different angles in the first scan direction and in the second scan direction.

5. The image display device according to claim 4, wherein the diffusion angle of the laser light at the diffusion plate is larger in the first scan direction than in the second scan direction.

6. The image display device according to claim 1, further comprising a field-angle adjustment means that changes a field angle of an observed image independent of diopter adjustment by the virtual-image diopter adjustment section.

7. The image display device according to claim 1, wherein the holographic optical element as the combiner has positive power.

8. The image display device according to claim 1, wherein in an incidence plane that includes the optical axis of incident light to the holographic optical element as the combiner and the optical axis of reflection light from the holographic optical element as the combiner, an incident angle and a diffraction angle at the holographic optical element are different from each other.

9. A head-mounted display comprising:
   the image display device according to claim 1; and
   a support member that supports the image display device in front of an observer.

10. A head-up display comprising the image display device according to claim 1, wherein a holographic optical element as a combiner of the image display device is held by a windshield.

11. An image display device that guides image light from an image generation portion to an optical pupil of an eyepiece optical system, thereby allowing an observer to observe a virtual image of an image at a position of the optical pupil, the image generation portion including:
   a laser light source;
   a deflector that deflects and scans laser light emitted from the laser light source by a reflection surface in two scan directions which are perpendicular to each other; and
   a diffusion plate that is disposed on an image surface of the eyepiece optical system and diffuses the laser light deflected by the deflector;
   wherein the eyepiece optical system includes a holographic optical element of a volume-phase type and of a reflective type as a combiner which diffracts and reflects the image light from the image generation portion to guide the image light to the optical pupil and in parallel with which, transmits and guides external light to the optical pupil and
   when an axis that optically connects a scan center of the reflection surface of the deflector and a center of the optical pupil to each other is an optical axis, the image display device comprises:
   a virtual-image diopter adjustment section that moves the image generation portion along the optical axis to adjust a diopter of the virtual image; and
   a correction lens that is disposed between the deflector and the diffusion plate;

wherein the optical pupil and the reflection surface of the deflector are in an optically conjugate positional relationship; and wherein the eyepiece optical system is a telecentric optical system.

12. The image display device according to claim 11, wherein the holographic optical element as the combiner has positive power.

13. The image display device according to claim 11, wherein in an incidence plane that includes the optical axis of incident light to the holographic optical element as the combiner and the optical axis of reflection light from the holographic optical element as the combiner, an incident angle and a diffraction angle at the holographic optical element are different from each other.

14. A head-mounted display comprising:
the image display device according to claim 11; and
a support member that supports the image display device in front of an observer.

15. A head-up display comprising the image display device according to claim 11, wherein a holographic optical element as a combiner of the image display device is held by a windshield.

* * * * *